United States Patent [19]

Ishihara et al.

[11] Patent Number: 5,058,181
[45] Date of Patent: Oct. 15, 1991

[54] HARDWARE AND SOFTWARE IMAGE PROCESSING SYSTEM

[75] Inventors: Hideshi Ishihara; Satoshi Yoneda, both of Takatsuki; Hiroshi Nakamoto, Mukou; Hidenori Kurioka; Hitosi Naitoh, both of Kyoto, all of Japan

[73] Assignee: Omron Tateisi Electronics Co., Kyoto, Japan

[21] Appl. No.: 469,351

[22] Filed: Jan. 24, 1990

[30] Foreign Application Priority Data

| Jan. 25, 1989 | [JP] | Japan | 1-15578 |
| Jan. 27, 1989 | [JP] | Japan | 1-19266 |
| Jan. 27, 1989 | [JP] | Japan | 1-19267 |
| Jan. 27, 1989 | [JP] | Japan | 1-19268 |
| Feb. 17, 1989 | [JP] | Japan | 1-38045 |
| Mar. 1, 1989 | [JP] | Japan | 1-49384 |
| Mar. 27, 1989 | [JP] | Japan | 1-74576 |

[51] Int. Cl.$^5$ .............................................. G06K 9/48
[52] U.S. Cl. ........................................ 382/22; 382/21
[58] Field of Search ................. 382/22, 21, 27, 41, 382/28

[56] References Cited

U.S. PATENT DOCUMENTS

| 4,642,813 | 2/1987 | Wilder | 382/22 |
| 4,703,512 | 10/1987 | Saka et al. | 382/22 |
| 4,773,098 | 9/1988 | Scott | 382/22 |
| 4,955,064 | 9/1990 | Shirasaka et al. | 382/22 |
| 4,962,539 | 10/1990 | Takeo et al. | 382/22 |

Primary Examiner—Stephen Brinich
Attorney, Agent, or Firm—Dickstein, Shapiro & Morin

[57] ABSTRACT

A hardware and software image processing system is disclosed in which geometric features are extracted from a graphic image included in a picture image of an object according to data on edge addresses by carrying out an edge detection and address data collection requiring a large amount of processing work using dedicated hardware circuitry and carrying out arithmetic and other processes by means of software and a microcomputer.

14 Claims, 30 Drawing Sheets

N: NUMBER OF PIXELS IN EACH LINE

E0: EDGE ADDRESSES (RELATIVE TO THE LEFT MOST POINT IN THE WINDOW)

Xb AND Yb: COORDINATE OF THE UPPER LEFT END OF THE WINDOW (STORED UPON DEFINING OF THE WINDOW)

Xs AND Ys: WINDOW SIZE (STORED UPON DEFINING OF THE WINDOW)

$E_N$: NUMBER OF EDGES

FIG. 6

(a) WINDOW TABLE

| ADDRESS | | |
|---|---|---|
| WT₁ | WA₁ | j=1 |
| WT₁+1 | WA₃ | |
| +2 | WA₁ | j=3 |
| +3 | WA₂ | |
| +4 | WA₃ | |
| +5 | WA₁ | j=4 |
| +6 | WA₂ | |
| +7 | WA₃ | |
| ⋮ | | |
| WT₁+n | | |

ADDRESSES (WA1, WA3) OF THE CUMULATIVE ARITHMETIC OPERATION VALUES CORRESPONDING TO THE WINDOWS W1 AND W3 ON THE SCANNING LINE

(b) CUMULATIVE ARITHMETIC OPERATION VALUES TABLE

| ADDRESS | | | |
|---|---|---|---|
| WA₁ | $m_{101}$ | $m_{110}$ | $m_{100}$ |
| WA₂ | $m_{201}$ | $m_{210}$ | $m_{200}$ |
| WA₃ | $m_{301}$ | $m_{310}$ | $m_{300}$ |
| ⋮ | | | |
| WA_N | $m_{N01}$ | $m_{N10}$ | $m_{N00}$ |

|  | WBX0 | WBX1 | WBY0 | WBY1 |
|---|---|---|---|---|
| WRITING FROM (0,0) | 0 | 0 | 0 | 0 |
| WRITING FROM H=128 | 1 | 0 | - | - |
| WRITING FROM H=256 | 0 | 1 | - | - |
| WRITING FROM H=384 | 1 | 1 | - | - |
| WRITING FROM V=128 | - | - | 1 | 0 |
| WRITING FROM V=256 | - | - | 0 | 1 |
| WRITING FROM V=384 | - | - | 1 | 1 |

| ADDRESS COUNTER | | WINDOW MEMORY SELECT | | WINDOW MEMORY ADDRESS | |
|---|---|---|---|---|---|
| X8 | X7 | WBX1 | WBX0 | A5 | A4 |
| 0 | 0 | 0 | 0 | 0 | 0 |
| 0 | 0 | 0 | 1 | 0 | 1 |
| 0 | 0 | 1 | 0 | 1 | 0 |
| 0 | 0 | 1 | 1 | 1 | 1 |
| 0 | 1 | 0 | 0 | 0 | 1 |
| 0 | 1 | 0 | 1 | 1 | 0 |
| 0 | 1 | 1 | 0 | 1 | 1 |
| 0 | 1 | 1 | 1 | - | - |
| 1 | 0 | 0 | 0 | 1 | 0 |
| 1 | 0 | 0 | 1 | 1 | 1 |
| 1 | 0 | 1 | 0 | - | - |
| 1 | 0 | 1 | 1 | - | - |
| 1 | 1 | 0 | 0 | 1 | 1 |
| 1 | 1 | 0 | 1 | - | - |
| 1 | 1 | 1 | 0 | - | - |
| 1 | 1 | 1 | 1 | - | - |

*FIG. 16*

| ADDRESS COUNTER | | WINDOW MEMORY SELECT | | WINDOW MEMORY ADDRESS | |
|---|---|---|---|---|---|
| Y8 | Y7 | WBY1 | WBY0 | A14 | A13 |
| 0 | 0 | 0 | 0 | 0 | 0 |
| 0 | 0 | 0 | 1 | 0 | 1 |
| 0 | 0 | 1 | 0 | 1 | 0 |
| 0 | 0 | 1 | 1 | 1 | 1 |
| 0 | 1 | 0 | 0 | 0 | 1 |
| 0 | 1 | 0 | 1 | 1 | 0 |
| 0 | 1 | 1 | 0 | 1 | 1 |
| 0 | 1 | 1 | 1 | - | - |
| 1 | 0 | 0 | 0 | 1 | 0 |
| 1 | 0 | 0 | 1 | 1 | 1 |
| 1 | 0 | 1 | 0 | - | - |
| 1 | 0 | 1 | 1 | - | - |
| 1 | 1 | 0 | 0 | 1 | 1 |
| 1 | 1 | 0 | 1 | - | - |
| 1 | 1 | 1 | 0 | - | - |
| 1 | 1 | 1 | 1 | - | - |

*FIG. 17*

GRADATION EXTRACTION LEVELS FOR W0

MEMORY MAP OF R    TABLE CONTENTS OF THE WINDOW W0

FIG. 30

(A) VERTICAL ADDRESS TABLE

| ADDRESS | |
|---|---|
| 1 | 0 |
| 2 | WT₁ |
| 3 | WT₂ |
| 4 | WT₂ |
| 5 | WT₃ |
| 6 | WT₃ |
| 7 | WT₄ |
| 8 | WT₄ |
| 241 | |
| 242 | |

(B) WINDOW TABLE

ADDRESSES (WA1, WA3) OF THE PERIPHERAL LENGTH STORAGE AREAS CORRESPONDING TO THE WINDOWS W1 AND W2 ON THE SECOND SCANNING LINE y2

| ADDRESS | |
|---|---|
| WT₁ | WA₁ |
| WT₁+1 | WA₃ |
| WT₂ | WA₁ |
| +1 | WA₂ |
| +2 | WA₃ |
| WT₃ | WA₁ |
| +1 | WA₂ |
| WT₄ | WA₃ |

$y_3 \cdot y_4$, $y_5 \cdot y_6$, $y_7 \cdot y_8$ (C) PERIPHERAL LENGTH AREAS

| ADDRESS | LATERAL COMPONENT | VERTICAL COMPONENT | RIGHTWARDLY RISING COMPONENT | LEFTWARDLY RISING COMPONENT |
|---|---|---|---|---|
| WA₁ | ΣL₁ᵢ | ΣR₁ᵢ | ΣV₁ᵢ | ΣH₁ᵢ |
| WA₂ | ΣL₂ᵢ | ΣR₂ᵢ | ΣV₂ᵢ | ΣH₂ᵢ |
| WA₃ | ΣL₃ᵢ | ΣR₃ᵢ | ΣV₃ᵢ | ΣH₃ᵢ |
| --- | | | | |
| WAn | ΣLnᵢ | ΣRnᵢ | ΣVnᵢ | ΣHnᵢ |

HARDWARE AND SOFTWARE IMAGE PROCESSING SYSTEM

TECHNICAL FIELD

The present invention relates to an image processing system having a function to detect an edge of a graphic image included in an inputted picture image and to extract features, such as an area, a gravitational center, an inclination and so on, of the graphic image.

BACKGROUND OF THE INVENTION

The present invention is intended to increase the processing speed and to reduce the size and cost of an image processing system for detecting an edge of a graphic image included in an inputted picture image by carrying out edge detection and address data collection requiring a large amount of processing work by means of a dedicated hardware circuit and carrying out arithmetic and other processes by means of software.

Conventionally, with regards to such an image processing system, there have been known two methods for extracting features of a graphic image:

(1) Computing representative values of a graphic image after writing image data into a memory and carrying out a software process thereon; and (2) Computing representative values of a graphic image as a hardware process either while writing image data into a memory or after writing image data into a memory.

However, in the case of (1) the software process, because of a limited processing speed, a considerable time is required for the computing process.

In the case of (2) the hardware process, the computing speed is high but the system tends to be bulky and expensive, and limited in versatility.

In some applications of industrial image processing systems, it is highly desired to compute the locations of the centers of gravity of objects to be inspected or monitored. When there are a plurality of objects in a single frame, it is necessary to compute the center of gravity for each of the objects. Conventionally, each frame was divided into a plurality of windows each containing one of the objects to be monitored, and the arithmetic operation for finding the center of gravity was carried out on each of the objects or, in other words, each of the windows defined in the single frame.

However, according to this conventional process, the time required for carrying out the necessary arithmetic operation increased in proportion to the number of objects in each frame, and this process was found to be impractical when there are a substantially large number of objects in each frame.

Conventionally, in an image processing system for measuring such geometrical features as areas, gravitational centers, inclinations and so on, it has been customary to provide a memory having a same capacity as the size of the frame, and measure each part of the picture image transferred onto one of a plurality of windows after transferring the picture image onto the same coordinates in the memory so as to permit to read out and process the memory contents during the measurement process.

However, such a conventional process has the following problem.

Suppose that the frame size is given by 512 by 512 pixels as shown in FIG. 11, and windows are defined around the coordinates of three objects A, B and C in a picture image. According to this conventional method, when three objects A, B and C are included in a frame D, it was necessary either to prepare a window memory for three frames or to rewrite the contents of the memory for the measurement process of each of the windows.

Therefore, no matter how small the windows may be, it was necessary to prepare a memory having a capacity for a same number of frames as there are windows, and the necessary capacity of the memory increased in proportion to the number of the windows. If the capacity of the memory is not increased, it becomes necessary to rewrite memory each time a measurement for a new window is to be carried out, and the processing speed is significantly reduced.

In some applications, it is desired to detect differences in gradation levels. When a monochromatic CCD camera or the like is used, differences in color may be detected as differences in gradation levels. An image processing system which is capable of detecting fine differences in gradation levels can offer an improved inspection capability through mechanization of the visual inspection of industrial products which has conventionally been performed by naked human eyes.

However, according to conventional image processing systems, because of the use of a gradation recognition system based on the conversion of the gradation levels of the products to be inspected into binary data by defining a certain threshold level, the following problems existed.

Specifically, when the difference in gradation is small between an industrial product or an object and its background, for instance when the product is yellow while the background is white, extraction of the external view of the product tends to be difficult, extraction of an arbitrary extraction level may be impossible, and the circuit structure tends to be complex when a plurality of windows are defined in a single frame and a threshold level is to be defined individually for each of the windows.

Also, according to the conventional technology, it has been impossible to inspect the gradation of industrial products when a plurality of windows are superimposed one over the other.

BRIEF SUMMARY OF THE INVENTION

In view of such problems of the prior art, a primary object of the present invention is to provide an image processing system which can compute representative values of a graphic image in a short time and which is compact and economical.

A second object of the present invention is to provide an image processing system which can obtain the position of the center of gravity of each object displayed on each frame even when the number of such objects on each screen is substantially large without requiring an excessive amount of time.

A third object of the present invention is to provide an image processing system which can significantly reduce the necessary capacity of memory and increase the processing speed of an image processing system having a plurality of windows in a single frame by dividing the frame into a plurality of windows in such a manner that the picture images of the objects are recorded in the window memory for each of the windows, and drawing the picture images of the objects onto a plurality of divided regions depending on the sizes of the windows.

A fourth object of the present invention is to provide an image processing system which can accurately recognize and grasp the gradation level of an object even when the object is hard to distinguish from the background, by using a simple circuit and at high speed, and permits combination of a plurality of windows.

A fifth object of the present invention is to provide an image processing system which can find the peripheral length of a picture image on a real time basis so as to be used in automated manufacturing process or the likes.

These and other objects of the present invention can be accomplished by providing an image processing system, comprising: camera means for taking a picture image of an object and producing a corresponding picture image signal; a binary discrimination means for converting the picture image signal into a binary signal; storage means for storing the binary signal; and feature extracting means for extracting a geometric feature of the picture image by processing the binary signal. Preferably, the feature extracting means comprises: an edge detection circuit having a hardware structure for detecting an edge defining a picture image as given by reversion of the binary signal stored in the storage means, and writing addresses of the detected edge into an edge information memory; and an arithmetic processing unit for computing, through a software process, geometric features from a graphic image included in the picture image of the object according to data on edge addresses stored in the edge information memory.

According to the present invention, the processing speed is increased and the size and cost of the system is reduced by carrying out edge detection and address data collection requiring a large amount of processing work by means of a dedicated hardware circuit and carrying out arithmetic and other processes by means of software.

Further, since the software of its arithmetic unit can be easily modified, the versatility of the processing work can be improved, and the range of application of the system can be broadened.

According to a certain aspect of the present invention, the storage means comprises first storage means for storing a plurality of windows defined in a frame of the picture image, window signal generating means for reading data from each of the windows in synchronism with each horizontal scanning process and producing a window signal to identify locations of the windows, second storage means for storing the sequence of encounters of the windows during the horizontal scanning process; and the feature extracting means comprises arithmetic operation means for computing a number of pixels occupied by a graphic image included in each of the windows, a horizontal first moment of the graphic image with respect to its horizontal coordinate for each pixel in the graphic image, and a vertical first moment of the graphic image with respect to its vertical coordinate for each pixel in the graphic image, cumulative arithmetic operation means for summing up the horizontal first moments and the vertical first moments for a graphic image included in each of the windows, and gravitational center computing means for computing a gravitational center of the graphic image in each of the windows according to the number of pixels occupied by the graphic image, a cumulative sum of the horizontal first moments and a cumulative sum of the vertical first moments for a graphic image included in each of the windows.

Thus according to this aspect of the present invention, the arithmetic operation for obtaining a gravitational centers in a plurality of operation regions can be completed at most in a single field scan period (typically one sixtieth of a second or 16.7 ms). Therefore, according to the present invention, an extremely fast image processing is possible, and a significant improvement can be accomplished in automated visual inspections in automated manufacturing facilities where real time operation of such inspection systems are required.

Furthermore, even when the number of processing regions is increased, for instance when several hundred regions are defined, it will merely increase the storage areas for the second and the third memory storage means, and no substantial modification of the overall circuit structure is required thus keeping the overall structure highly simple without regards to the processing capacity of the system. It is possible to increase the number of processing regions to several hundred or even more if desired without substantially complicating the overall structure of the system or increasing the time required for arithmetic operations.

According to another aspect of the present invention, the storage means comprises a window memory which is partitioned into a plurality of sections corresponding to a plurality of windows fixedly defined in a single display frame; and the feature extracting means comprises a measurement processing unit for allocating each of a plurality of objects included in a single frame to one or more of the windows without regards to its physical location of the object in the frame.

According to this aspect of the present invention, since a plurality of windows are allocated to a single window memory and picture images of a plurality of objects can be written thereinto, it becomes unnecessary to rewrite the window memory even when measurements of a plurality of objects are to be carried out, and reduction in the necessary capacity of the memory and a significant improvement in the processing speed can be accomplished.

Furthermore, if a plurality of windows having a same configuration but different coordinates are defined, it becomes possible to carry out a measurement process by drawing an object in only one of the windows.

According to yet another aspect of the present invention, the image processing system further comprises gradation input means for obtaining a gradation signal representing a distribution of gradation in a picture image to be processed; and the storage means comprising an image memory unit which may be partitioned into a plurality of sections corresponding to a plurality of windows defined in a single frame and which is adapted to store data on the gradation signal supplied from the gradation input means, and a table memory unit storing a plurality of tables each for an associated one of the windows so as to permit individual extraction of an arbitrary gradation level for each of the windows.

According to this aspect of the present invention, recognition and grasping of the gradation level of an object can be achieved under any background conditions with a simple structure through the use of a CPU, by storing the gradation level of each of a plurality of windows in an image memory, and using a table for individually and arbitrarily extracting a gradation level according to the gradation level stored in the image memory, and permits not only a high processing speed but also superimposing a plurality of windows by allocating the tables at a fixed address interval.

According to a preferred embodiment of the present invention which is directed to the determination of the peripheral length of a picture image of an object, the feature extracting means comprises means for detecting an edge of a picture image, means for detecting a vertical component, a horizontal component or an oblique component from each detected edge, and means for adding up the components over an entire length of the periphery of the picture image to obtain a peripheral length thereof.

According to this aspect of the present invention, the peripheral length of each object in a single frame can be obtained in real time without requiring a large memory and any complex hardware.

BRIEF DESCRIPTION OF THE DRAWINGS

Now the present invention is described in the following in terms of specific embodiments with reference to the appended drawings, in which:

FIG. 6 is a diagram illustrating the relationship between the window table and the cumulative arithmetic values table defined in the memory;

FIGS. 14 through 17 are diagrams and tables showing how data are written into the respective window memories according to the third embodiment of the present invention;

FIGS. 30(A), 30(B) and 30(C) showing the relationship between the contents of the vertical table and the window table, and the peripheral lengths areas;

DETAILED DESCRIPTION OF THE PREFERRED EMBODIMENT(S)

Now preferred embodiments of the present invention are described in the following with reference to the appended drawings.

Figure 1:
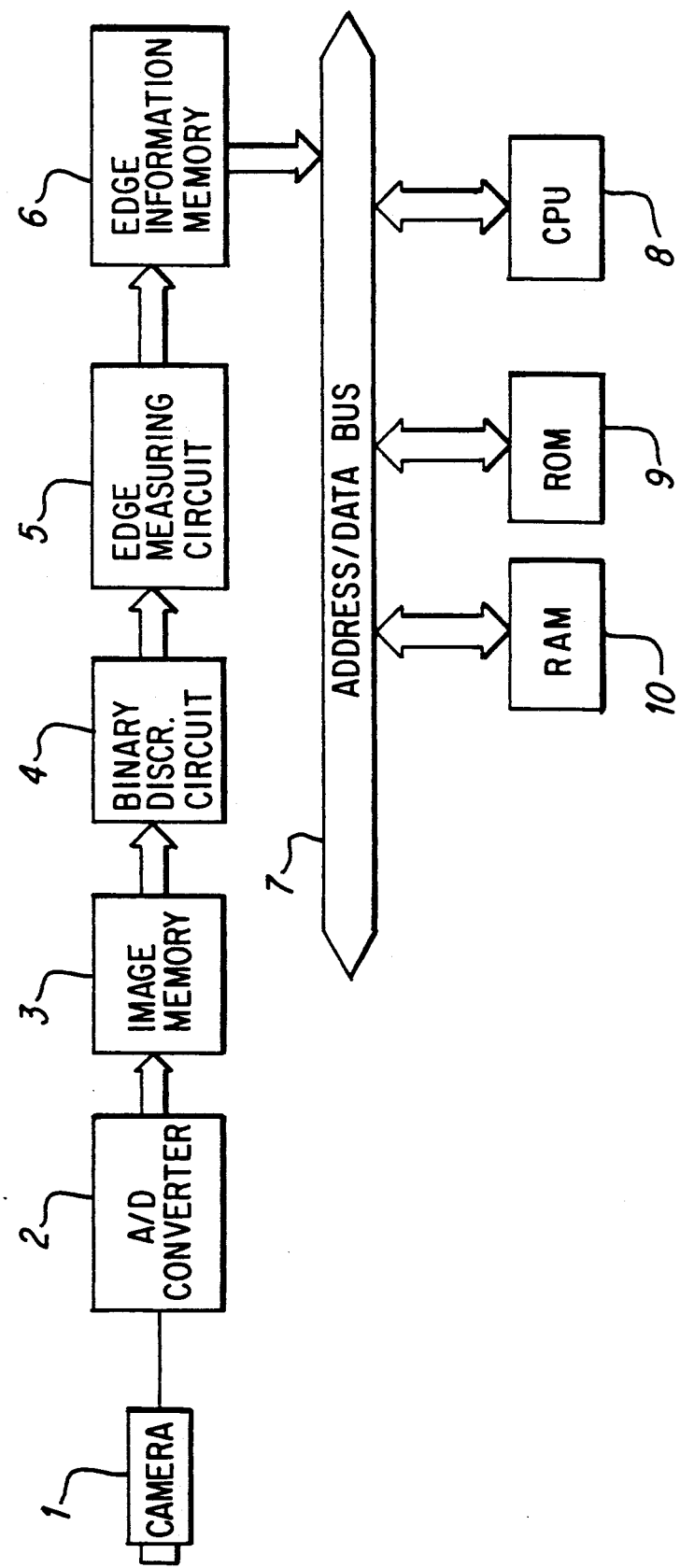
FIG. 1 is a block diagram of a first embodiment of the image processing system according to the present invention.

FIG. 1 is a block diagram of the electric structure of an image processing system to which the present invention is applied. In the drawing, an A/D converter 2 converts an image signal supplied from a camera 1 into a digital signal and supplies it to an image memory 3. The image memory 3 stores the inputted digital signal and supplies the contents of the stored image signal to a binary discrimination circuit 4 at a predetermined timing. The binary discrimination circuit 4 discriminates the digitalized image signal supplied thereto by a predetermined level and converts it into binary data consisting of either "0" or "1", and sends it to an edge measurement circuit 5.

The edge measurement circuit 5 detects a reversion of data, or transition from "1" to "0" or from "0" to "1", on each of the horizontal lines defining a picture image to determine it as an edge of the picture image, and extracts an address (X coordinate) of a point on the line corresponding to the detected edge to send this address to the edge information memory 6. The edge detection memory 6 stores data on the inputted addresses, and sends it to a data/address bus 7 as required.

A microcomputer unit is formed by a CPU 8, ROM 9, RAM 10 and so on connected to this data/address bus 7. This microcomputer unit reads out edge address data stored in the edge information memory 6 via the data/address bus 7 so as to recognize a graphic image included in a window defined within the picture image and to compute the area, gravitational center, inclination and so on of the graphic image.

In other words, according to this system, the processes of detecting an edge of a graphic image contained in an inputted picture image and writing down edge address data thereof are assigned to a dedicated hardware circuit while the process of computing an area, a gravitational center, an inclination and so on is assigned to a microcomputer.

Since edge detection by a dedicated hardware circuit can be carried out in a continual fashion as opposed to a software detection process which needs to be carried out pixel by pixel, a significant improvement can be accomplished in the processing speed of detecting an edge which requires a most significant amount of processing work.

Further, by having a microprocessor carry out the process of writing edge address data and the subsequent processes, the size and cost of the system can be reduced, and the parameters of process execution can be readily modified simply by changing the program.

Now is described the procedure for computing representative values from a graphic image by using edge address data.

Generally speaking, the area (AREA), the gravitational center (XG, YG), and the major axis angle ($\theta$) defined in a two-dimensional coordinate system by dots are determined by the following equations:

$$AREA = \sum_i \sum_j f(i,j) \tag{1}$$

$$XG = \frac{\sum_i \sum_j f(i,j)i}{\sum_i \sum_j f(i,j)} \tag{2}$$

$$YG = \frac{\sum_i \sum_j f(i,j)j}{\sum_i \sum_j f(i,j)} \tag{3}$$

$$= \frac{1}{2} \tan^{-1} \frac{2 M_{1,1}}{M_{2,0} - M_{0,2}} \tag{4}$$

where $M_{1,1} = \sum_i \sum_j f(i,j)ij - \frac{\sum_i \sum_j f(i,j)i \sum_i \sum_j f(i,j)j}{\sum_i \sum_j f(i,j)}$ \hfill (5)

$$M_{2,0} = \sum_i \sum_j f(i,j) i^2 - \frac{\left(\sum_i \sum_j f(i,j)i\right)^2}{\sum_i \sum_j f(i,j)} \tag{6}$$

$$M_{0,2} = \sum_i \sum_j f(i,j) j^2 - \frac{\left(\sum_i \sum_j f(i,j)j\right)^2}{\sum_i \sum_j f(i,j)} \tag{7}$$

To simplify the expression of these equations, the following definitions are made.

$$SUMX = \sum_i \sum_j f(i,j)i$$

$$SUMY = \sum_i \sum_j f(i,j)j$$

$$SUMXY = \sum_i \sum_j f(i,j)ij$$

$$SUMX2 = \sum_i \sum_j f(i,j)i^2$$

$$SUMY2 = \sum_i \sum_j f(i,j)j^2$$

Thus, equations (2), (3), (5), (6) and (7) can be expressed as given in the following:

$$XG = \frac{SUMX}{AREA} \tag{8}$$

$$YG = \frac{SUMY}{AREA} \tag{9}$$

$$M_{1,1} = SUMXY - \frac{SUMX \, SUMY}{AREA} \tag{10}$$

$$M_{2,0} = SUMX2 - \frac{SUMX^2}{AREA} \tag{11}$$

$$M_{0,2} = SUMY2 - \frac{SUMY^2}{AREA} \tag{12}$$

Figure 2:
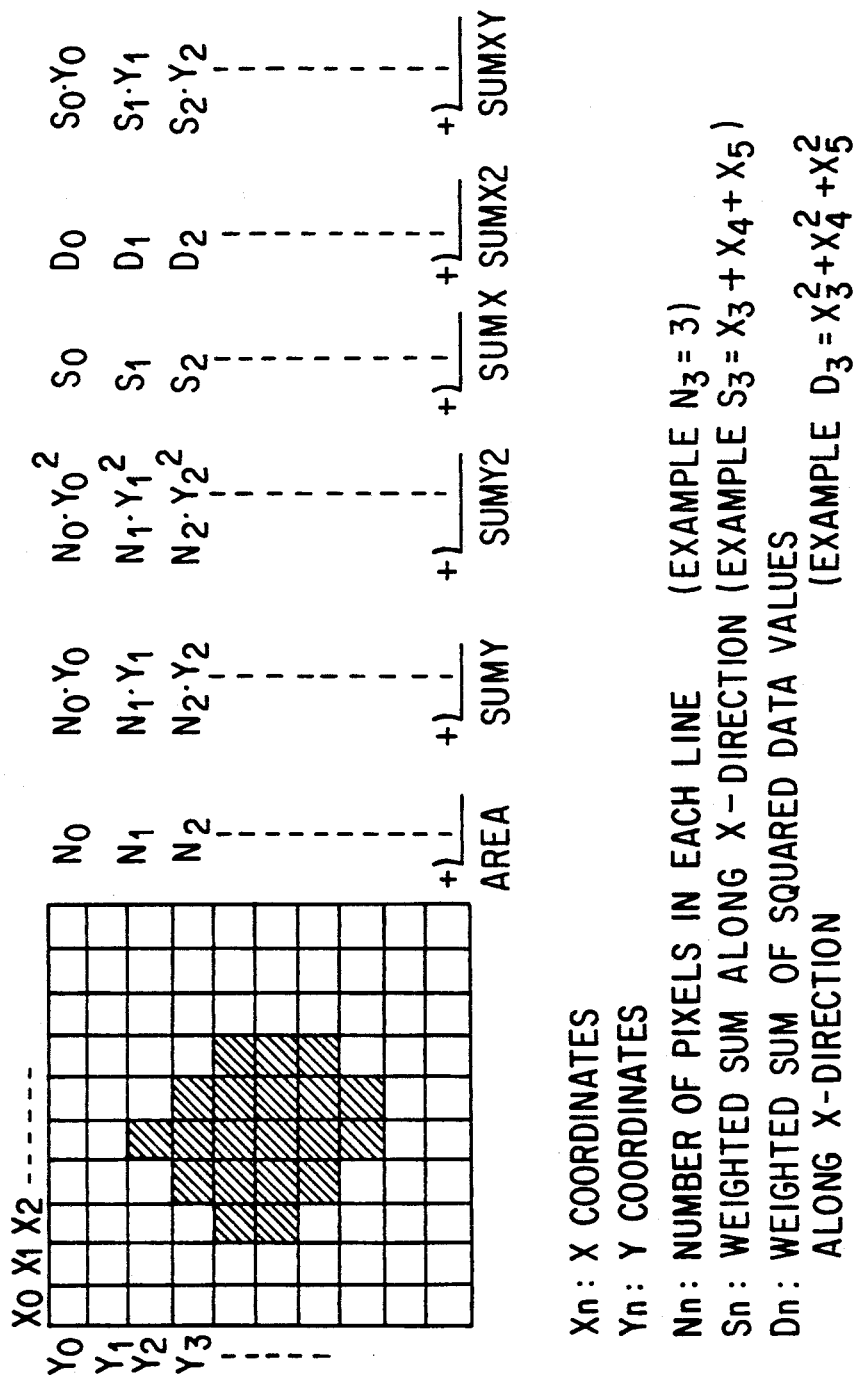
FIG. 2 is illustrating the process of computing representative values of geometric features of a graphic image.

In the above equations, f(i,j) is either "0" or "1" as the graphic image is expressed by binary data. How AREA, SUMX, SUMXY, SUMX2, SUMY can be determined is illustrated in FIG. 2 in regards to a specific example of binary picture image.

In the case of the illustrated picture image, AREA, SUMX, SUMY, SUMXY, SUMX2 and SUMY2 can be determined by obtaining (1) the number of computed pixels (2)) a weighted sum of the data at each X-coordinate taken along the X-direction, and (3) a weighted sum of a square of the data at each X-coordinate taken along the X-direction for each line, while using the Y-coordinates as a counter, and adding them up.

When these values are substituted into equations (1) through (12), an area, a gravitational center and a major axis angle can be obtained.

Now is described how (1) the number of pixels to be computed, (2) the weighted sum of the data at each X-coordinate along the X-direction, and (3) the weighted sum of a square the data at each X-coordinate along the X-direction can be computed for each line from the edge address data.

Figure 3:
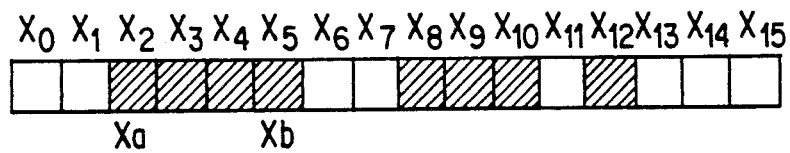
FIG. 3 is a diagram illustrating an example of a data pattern on a horizontal line.

When the edge coordinates in the pattern for each horizontal line are obtained as illustrated in FIG. 3, the weighted sum of the data values ($S_n$) and the weighted sum of the squared data values ($D_n$) can be determined as given in the following:

$$S = (X_2 + X_3 + X_4 + X_5) + (X_8 + X_9 + X_{10}) + (X_{12}) +$$
$$\left(\sum_{n=0}^{5} X_n - \sum_{n=0}^{1} X_n\right) + \left(\sum_{n=0}^{10} X_n - \sum_{n=0}^{7} X_n\right) +$$
$$\left(\sum_{n=0}^{12} X_n - \sum_{n=0}^{11} X_n\right)$$

-continued $$D = (X_2^2 + X_3^2 + X_4^2 + X_5^2) +$$
$$(X_8^2 + X_9^2 + X_{10}^2) + (X_{12}^2) +$$
$$\left(\sum_{n=0}^{5} X_n^2 - \sum_{n=0}^{1} X_n^2\right) + \left(\sum_{n=0}^{10} X_n^2 - \sum_{n=0}^{7} X_n^2\right) +$$
$$\left(\sum_{n=0}^{12} X_n^2 - \sum_{n=0}^{11} X_n^2\right)$$

Since the following relations generally hold, $$\sum_{k=0}^{n} K = (1/2)n(n + 1) \tag{13}$$

$$\sum_{k=0}^{n} K^2 = (1/6)n(n + 1)(2n + 1) \tag{14}$$

once the edge coordinates ($X_a$ and $X_b$) of the pattern are known, the weighted sum and the weighted sum of the squared values can be determined as given by the following:

$$S = \sum_{k=0}^{X_b} K - \sum_{k=0}^{X_a-1} K \tag{15}$$
$$= \frac{X_b(X_b + 1)}{2} - \frac{X_a(X_a - 1)}{2}$$

$$D = \sum_{k=0}^{X_b} K^2 - \sum_{k=0}^{X_a-1} K^2 \tag{16}$$
$$= (1/6)X_b(X_b + 1)(2X_b + 1) -$$
$$(1/6)X_a(X_a - 1)(2X_a - 1)$$

According to this embodiment, the contents of the image memory 3 are converted into binary data by a binary discrimination circuit 4, and this information is supplied to the edge measurement circuit 5 for each horizontal line. The edge measurement circuit 5 detects each transition point (pixel) from 0 to 1 or from 1 to 0 for each horizontal line from left to right, and stores the detected X-coordinates in the edge information memory 6. The contents of the edge information memory 6 are read by the CPU 10 from right to left.

Figure 4:
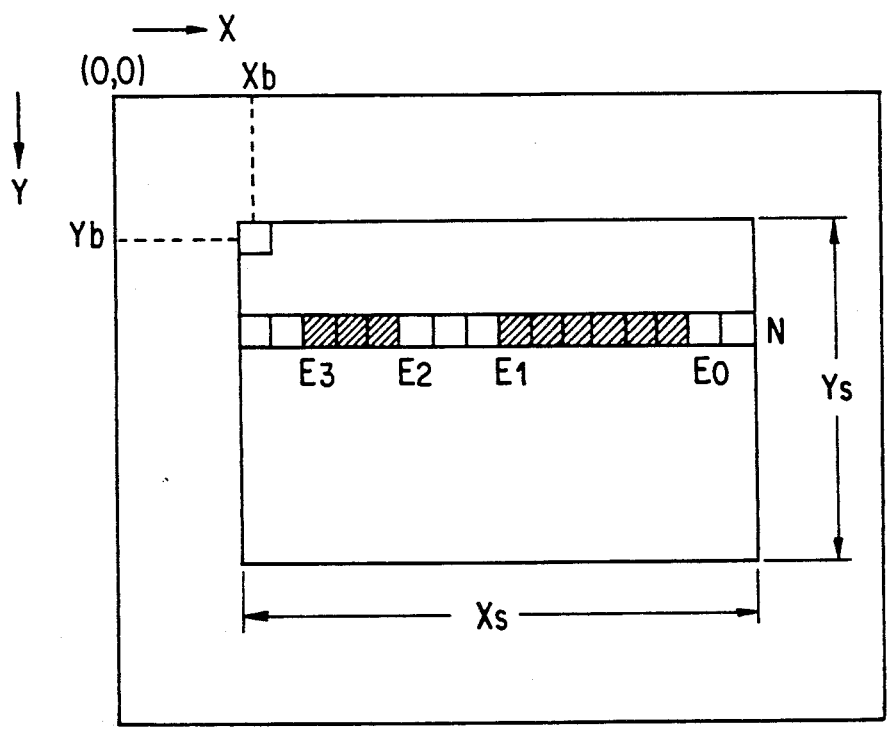
FIG. 4 is a view illustrating a window defined in a frame.

Further, according to the present embodiment, an arbitrary rectangular region is assigned as a window on the screen as shown in FIG. 4, and edge information within this arbitrary region is taken out in order to achieve a high versatility. The drawing shows it with respect to only one line. This window is defined by the coordinates of the upper left corner ($X_b$, $Y_b$) and its size ($X_s$, $Y_s$).

In this case also, AREA, SUMX, SUMY, SUMXY, SUMX2 and SUMY2 are computed as given in the following:

$$AREA = \sum_{j=Y_b}^{Y_b+Y_s} N_j \tag{17}$$

$$SUMX = \sum_{j=Y_b}^{Y_b+Y_s} S_j \tag{18}$$
$$= \sum_{j=Y_b}^{Y_b+Y_s} \left\{ \sum_{k=0}^{EN/2} \left( \frac{E_{2k}(E_{2k} - 1)}{2} - \frac{-E_{2k+1}(E_{2k+1} + 1)}{2} \right) \right\}$$

$$SUMY = \sum_{j=Y_b}^{Y_b+Y_s} N_j j \tag{19}$$

$$SUMXY = \sum_{j=Y_b}^{Y_b+Y_s} S_j j \tag{20}$$
$$= \sum_{j=Y_b}^{Y_b+Y_s} \left\{ \sum_{k=0}^{EN/2} \left( \frac{E_{2k}(E_{2k} - 1)}{2} - \frac{E_{2k+1}(E_{2k+1} + 1)}{2} \right) \right\} \cdot j$$

$$SUMX2 = \sum_{j=Y_b}^{Y_b+Y_s} D_j \tag{21}$$
$$= \sum_{j=Y_b}^{Y_b+Y_s} \left\{ \sum_{k=0}^{EN/2} \left( \frac{E_{2k}(E_{2k} - 1)(2E_{2k} - 1)}{2} - \frac{E_{2k+1}(E_{2k+1} + 1)(2E_{2k+1} + 1)}{2} \right) \right\}$$

$$SUMY2 = \sum_{j=Y_b}^{Y_b+Y_s} N_j j^2 \tag{22}$$

where $E'_n = E_n + X_b$

By substituting equations (17) through (22) into equations (8) through (12), an area, a gravitational center and a major axis angle can be obtained.

In regards to equations (18), (20) and (21), if they are stored as tables containing results of computation, an even more significant reduction in computation time can be achieved.

According to this embodiment, by obtaining the edge addresses of a graphic image by hardware, and by carrying out the above listed computations based upon this information by software, graphic features such as areas, gravitational centers, and major axis angles can be obtained both simply and quickly.

Moreover, by modifying the software, it is possible to additionally obtain other graphic features such as the circumferential lengths, the numbers of holes and the numbers of graphic images.

FIGS. 5 through 10 show a second embodiment of the present invention.

Referring to FIG. 1, three windows (processing regions) W1, W2 and W3 are defined in a single frame which consists of 256 by 242 pixels. Each horizontal line consists of 256 pixels. The number of windows may be selected as desired. However, each window must contain at least two by two pixels, and must be spaced from a horizontally adjacent window at least by one pixel. The lateral spacing of the windows is determined according to the operation speed of high speed memory as described hereinafter. On the other hand, the windows may closely adjoin each other in the vertical direction as long as they do not overlap each other. Therefore, it is possible to define more than 10,000 windows in a single frame. Further, each of the windows of the illustrated embodiment is rectangular but may have different shapes if desired.

Each of the windows includes a picture image which is, in the illustrated embodiment, given as a shaded area represented by a set of binary data. The present embodiment is capable of detecting the center of gravity of each of such picture images.

Suppose that the center of gravity of one of the picture images is given by a coordinate ($X_G$, $Y_G$) It is known that the center of gravity is given by the following formulae:

$$X_G = \frac{m_{10}}{m_{00}} = \frac{\sum_i \sum_j f(i,j)i}{\sum_i \sum_j f(i,j)} = \frac{\sum_j \left( \sum_i f(i,j)i \right)}{\sum_j N_j} \quad (23)$$

$$Y_G = \frac{m_{01}}{m_{00}} = \frac{\sum_i \sum_j f(i,j)j}{\sum_i \sum_j f(i,j)} = \frac{\sum_j (N_j j)}{\sum_j N_j} \quad (24)$$

where f(i,j) is a weighting function which, in the present embodiment, is either "0" or "1" as the picture image is given as a set of binary data. In other words, for those pixels included in the picture image $$f(i,j) = 0 \quad (25)$$

and for those pixels not included in the picture image $$f(i,j) = 1 \quad (26)$$

NJ denotes the number of pixels in the j-th horizontal scanning line.

The process of executing the arithmetic operation given by equations (23) and (24) may be carried out in the following manner:

(1) Measure the values of $N_j$, $$\sum_i f(i,j)i,$$

and $N_j j$ for each of the windows;
(2) Add up the respective values for each of the horizontal scanning lines, to thereby obtain the numerators and denominators of equations (23) and (24); and
(3) Carry out the arithmetic process given by equations (23) and (24) according to the values obtained in step (2) after completion of the scanning of each horizontal scanning line, to thereby obtain the coordinate of the gravitational center ($X_G$, $Y_G$)

Reading of data by picture taking means such as a CCD camera takes place along each horizontal scanning line j, and the horizontal scanning lines are scanned downwards from the upper most line to the lower most line in a sequential manner. In the present embodiment, since a plurality of windows are defined in each frame, it is necessary to distinguish the windows located along common horizontal scanning lines in step (2). To this end, a window table as shown in FIG. 6(a) is defined in a system memory which stores the windows (in the form of addresses of the cumulative arithmetic operation values table as described hereinafter) which are encountered during the scanning process in the order of their first encounters.

To execute the cumulative additions of the arithmetic operation values $N_j$, $$\sum_i f(i,j)i,$$

and $N_j j$ in step (2), there is defined a cumulative operation values table to store the cumulative operation values $$\left( \sum_j N_j, \sum_j \left( \sum_i f(i,j)i \right), \text{ and } \sum_j (N_j j) \right)$$

for each of the windows illustrated in FIG. 6(b). In this table, the cumulative operation values for the window W1

$$\left( m_{100} = \sum_j N_j, m_{110} = \sum_j \left( \sum_i f(i,j)i \right), \text{ and } m_{101} = \sum_j (N_j j) \right)$$

are stored at address WA1. Likewise, the cumulative operation values for the windows W2 and W3 are stored at addresses WA1 and WA2, respectively, or ($m_{200}$, $m_{210}$, and $m_{201}$) at address WA1 and ($m_{300}$, $m_{310}$, and $m_{301}$) at address WA3.

Referring again to FIG. 6(a), the addresses WA1 through WA3 of the cumulative arithmetic values table are stored in the window table in the order of the appearance of the corresponding windows W1 through W3.

Now the overall processing of a single field of data or a single frame is described in the following.

Figure 7:
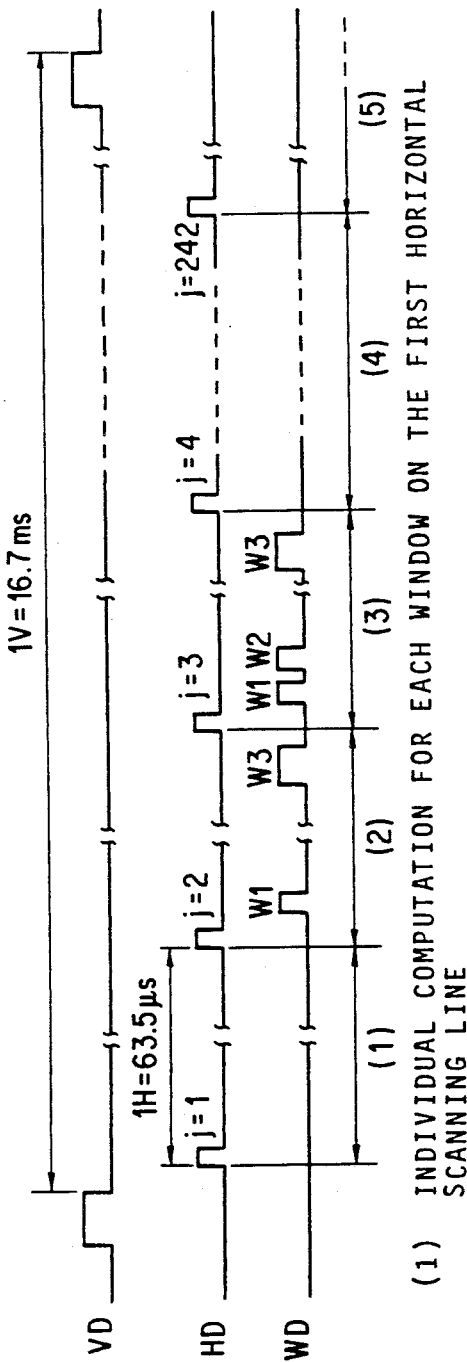
FIG. 7 is a time chart showing the outline of the operation of the second embodiment during a single field period.

FIG. 7 shows a vertical synchronization signal VD, a horizontal synchronization signal HD, and a window signal WD. The window signal WD is produced from the window memory in synchronism with the operation of the picture taking means as described hereinafter, and represents the positions of the windows in the frame.

During the scanning of the first horizontal scanning line (j=1), the three arithmetic operation values are computed in regards to the picture image included in each of the windows located along the horizontal scanning line. In the present embodiment, as there is no window which is located on the first horizontal scanning line, no arithmetic computation takes place.

During the scanning of the second horizontal scanning line (j=2), an address WT1 of the window table is looked up upon rising of the window signal WD, and, as result, it is found that this window corresponds to the window (or the window W1) which is to be stored at the address WA1. Therefore, during the time the window signal WD is high, the arithmetic operation values are computed. When this window signal WD has dropped to a low level, the arithmetic operation values are added to the cumulative operation values stored at the address WA1 of the cumulative operation values table.

When the window signal WD has risen back to the high level again, the address WT1+1 of the window table is looked up, and it is found that this window correspond to the window W3.. In a similar fashion as described above, during the time the window signal WD is high the arithmetic operation values are computed, and every time the window signal has dropped to the low level, the arithmetic operation values are added to the cumulative operation values stored at the address WA3 of the cumulative operation values table.

During the scanning of the third horizontal scanning line (j=3), the window table is looked up upon rising of the window signal WD, and, as a result, it is found that this window corresponds to the window W1. And, again, during the time the window signal WD is high, the arithmetic operation values are computed, and every time the window signal WD has dropped to the low level, the arithmetic operation values are added to the cumulative operation values stored at the address WAI of the cumulative operation values table. In this way, the windows W2 and W3 are identified by looking up the window table following the detection of the rises in the window signal WD.

This process is repeated until the 242nd horizontal scanning line is covered, and the arithmetic operation values are stored in the corresponding addresses of the cumulative operation values table for each of the windows. When the scanning of the 242nd horizontal scanning line is completed, the cumulative operation values in the cumulative operation values table are read out, and the coordinate of the center of gravity of the picture image in each of the windows is obtained by carrying out the arithmetic operation in step (3) for each of the windows.

Figure 8:
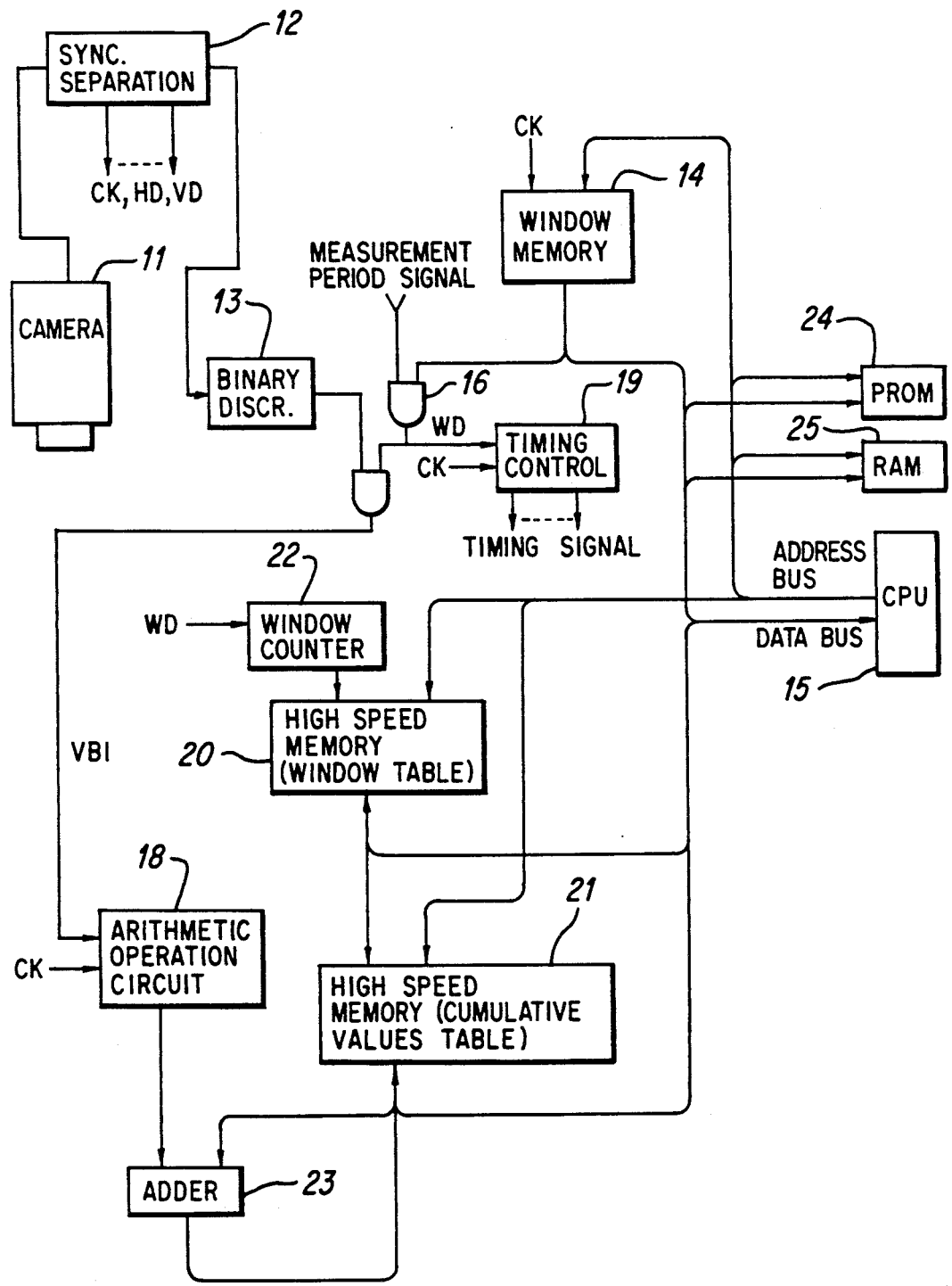
FIG. 8 is a block diagram of the hardware for the second embodiment.

FIG. 8 shows an example of the image processing system according to the present embodiment. A camera 11 comprises a image tube or a solid state image sensor such as CCD, and produces an image signal. The produced image signal is processed by a synchronization signal separation circuit 12, and a sampling clock for each of the pixels, a horizontal synchronization signal HD, and a vertical synchronization signal VD are obtained. The image signal is then supplied to a binary discrimination circuit 13, and is converted into a binary signal which is either "o" or "1" by comparing the analog image signal with a certain threshold level.

Figure 5:
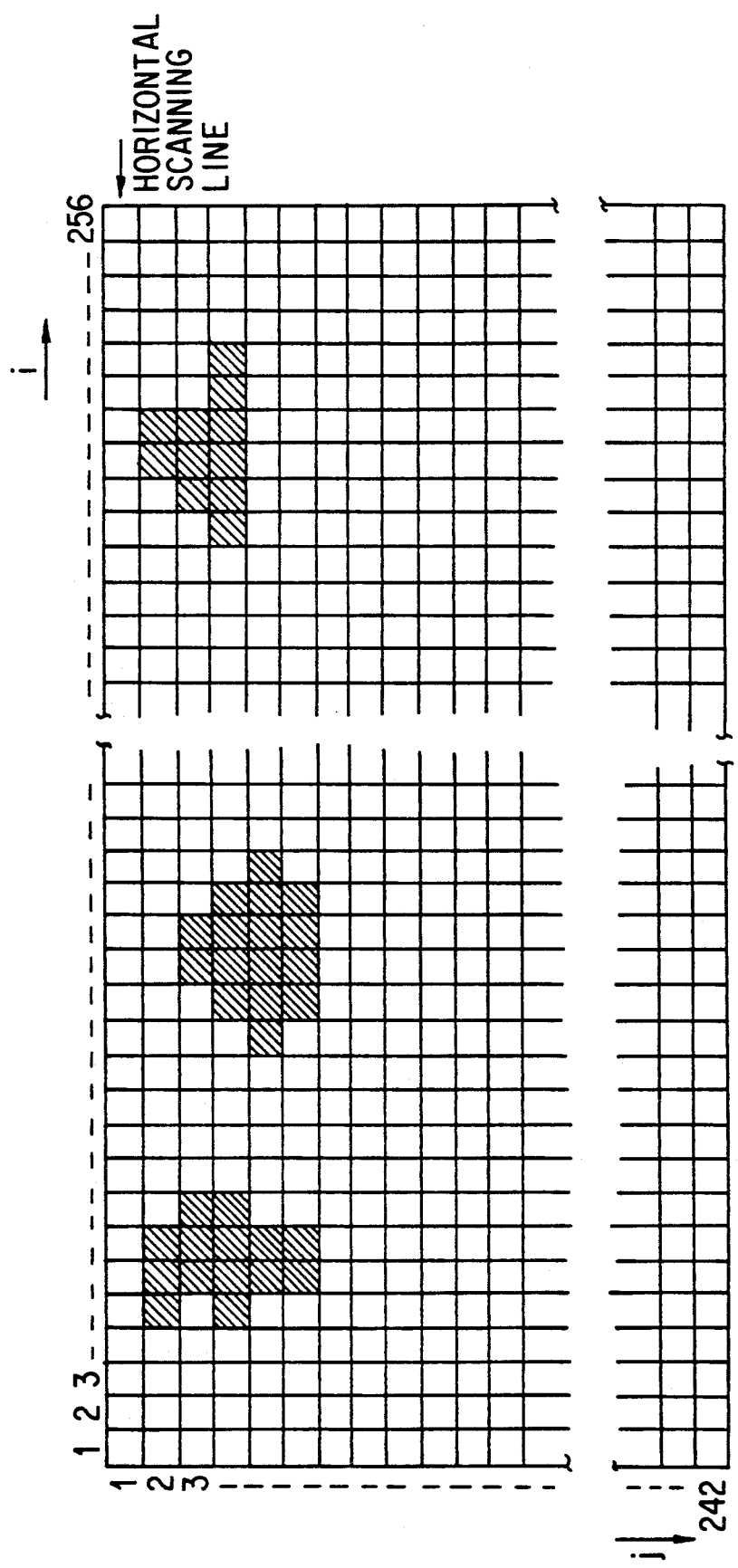
FIG. 5 is a view illustrating a window defined in a frame to illustrate the operation of a second embodiment of the present invention.

A window memory 14 stores such binary data, and has a capacity to store the data for a single frame according to the present embodiment. Further, the windows W1, W2 and W3 as illustrated in FIG. 5 are also stored in the window memory, for instance by writing bit "1" into areas belonging to any of the windows and bit "0" into areas not belonging to any of the windows. Such a definition of windows is executed by a CPU 15. The reading of data from the window memory is executed according to sampling clock CK, and the obtained data is converted into a window signal WD which is supplied to a gate 16.

The gate 16 is controlled by a measurement timing signal which is high (H) during each field of data is covered and is otherwise low (L). The gate 16 permits transmission of the window signal WD only during each measurement field. The window signal WD is in exact synchronism with the image signal from the camera 11. In other words, when the image signal is indicating the q-th bit of the p-th horizontal scanning line, the window signal WD also is indicating the q-th bit of the p-th horizontal scanning line.

Another gate 17 permits transmission of the binary image signal to an arithmetic operation circuit 18 only when any one of the windows is present. A timing control circuit 19 generates control signals for a high speed memory 19 for the window table, and a high speed memory 20 for the cumulative arithmetic operation values table according to the window signal WD and the sampling clock CK. The window table and the cumulative arithmetic operation values table are created by the CPU 15 prior to the start of the measurement. A window counter 22 counts pulses in the window signal WD and accordingly defines the addresses of the high speed memory 20 (WTI through WT1+n as given in FIG. 6(a).

The image processing system of the present embodiment further includes an arithmetic operation circuit 18 which computes the three arithmetic operation values $N_j$, $$\sum_i f(i,j)i,$$

and $N_j j$, and an adder 23 which adds the outputs from the arithmetic operation circuit 18 to the cumulative arithmetic operation values read out from the high speed memory 21, and the obtained sums are again stored into the same addresses of the high speed memory 21.

Figure 9:
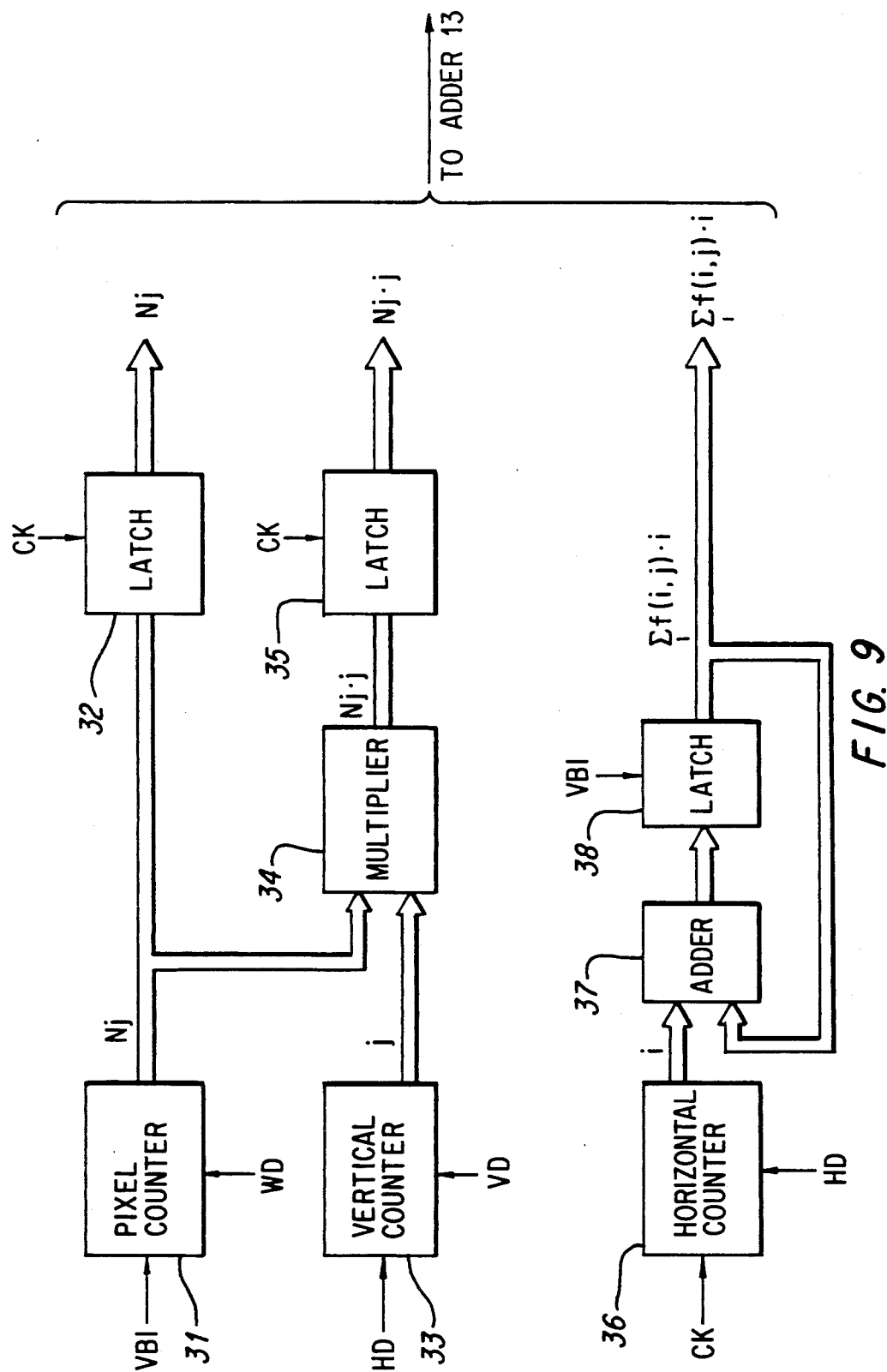
FIG. 9 is a more detailed block diagram of the arithmetic operation circuit in FIG. 8.

A specific example of the arithmetic operation circuit 18 is given in FIG. 9.

A pixel counter 31 counts the number of pixels $N_j$ from the binary image signal for each horizontal scanning line of each frame, and supplies its output to the adder 23 shown in FIG. 8 via a latch circuit 32. The pixel counter 31 is cleared by each falling edge of the window signal WD.

The vertical counter 33 counts pulses from the horizontal synchronization signal HD, and determines the vertical coordinate j. The vertical coordinate j is multiplied by the number of pixels $N_j$ at a multiplier 34, and its output is supplied to the adder 23 of FIG. 8 via a latch circuit 35. The vertical counter 33 is cleared by the vertical synchronization signal VD. The horizontal counter 36 counts pulses from the sampling clock CK, and determines the horizontal coordinate i. An adder 37 and a latch circuit 38 connected to the output end of the horizontal counter 36 produces a cumulative sum $$\sum_i f(i,j)i$$

for the regions occupied by picture images on each horizontal scanning line, and likewise supply an output to the adder 23 shown in FIG. 8. The horizontal counter 36 is cleared by the horizontal synchronization signal HD.

Referring to FIG. 8 again, the CPU 15 comprises PROM 24 storing the operation program for the CPU 15 and RAM 25 storing the finally obtained coordinates of the centers of gravity as well as data produced during the course of the arithmetic operations. The CPU 15 carries out, as mentioned above, writing of data into the window memory 14, writing of the window table into the high speed memory 20, initialization (clearing) of the cumulative arithmetic operation values table, reading out of the cumulative arithmetic operation values for each of the windows, and computation of the coordinate of the center of gravity of the picture image in each of the windows according to the obtained cumulative arithmetic operation values.

Before measurement is started, writing of data into the window memory 14, creation of a window table in the high speed memory 20, clearing of the cumulative arithmetic operation values table, and presetting of the window counter 22 to WT1−1 are carried out. Once the measurement signal has risen to the high level, the cumulative arithmetic operation is started.

Figure 10:
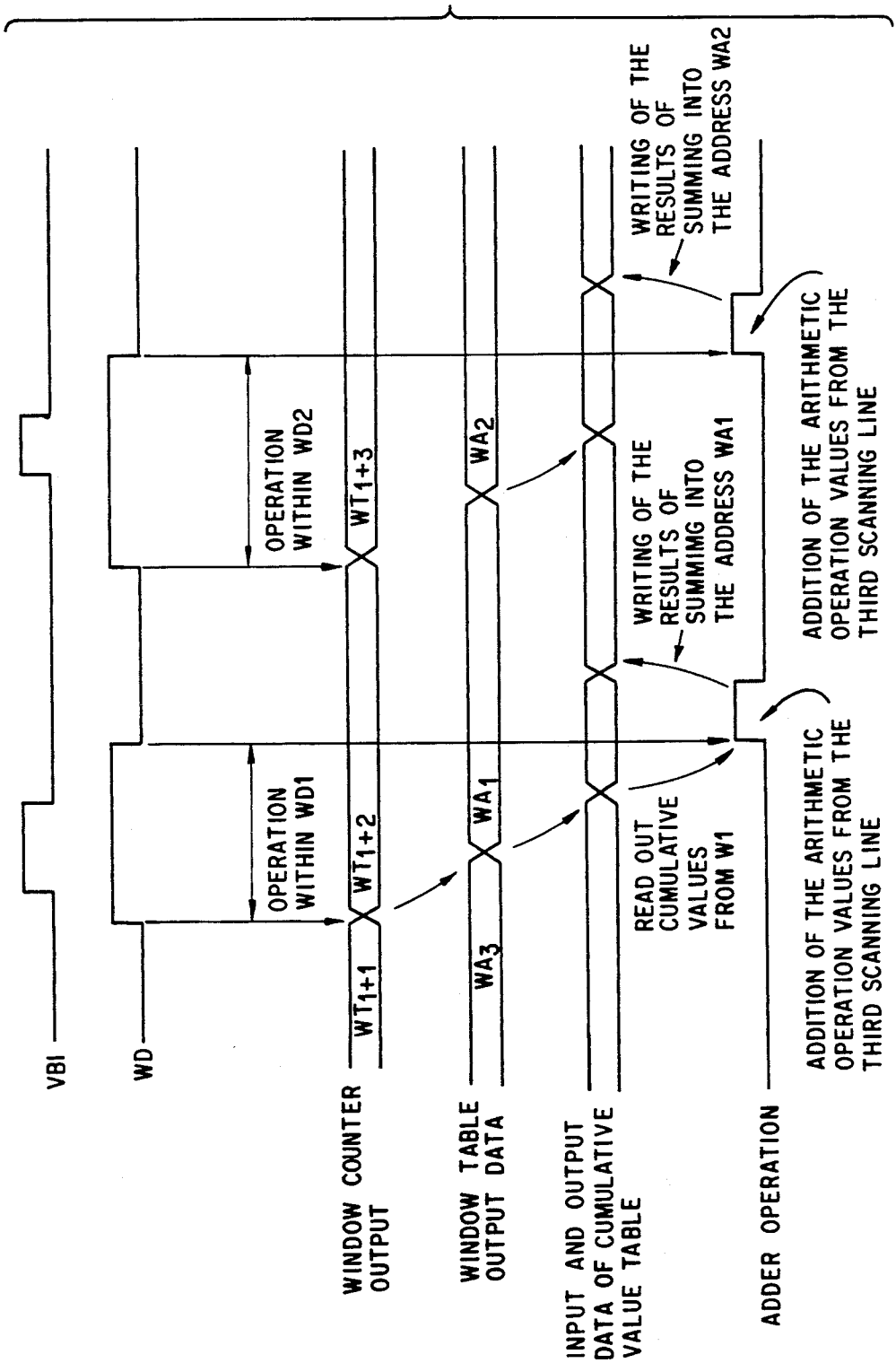
FIG. 10 is a time chart showing the operation of the second embodiment given in FIG. 8.

Now the process of this arithmetic operation is described in the following taking the example of the window W3 in the third horizontal scanning line with reference to FIG. 10.

When the window signal WD has risen to the high level the count of the window counter is incremented from WT1+1 to WT1+2. During the time the window signal WD is high, arithmetic operation derivation of the arithmetic operation values $N_j$, $$\sum_i f(i,j)i.$$

and $N_j i$ are carried out by the arithmetic operation circuit 18, and this process is terminated when the window signal WD has fallen to the low level.

When the count of the window counter 22 is incremented to WT1+2, data WA1 at address WT1+2 is read out from the high speed memory 20. The read out data WA1 gives the address of the high speed memory 21 from which the cumulative arithmetic operation values ($m_{101}$, $m_{110}$ and $m_{100}$) for the window W1 up to the current moment are read out.

The adder 23 is activated when the window signal WD falls to the low level to add up the computation results of the arithmetic operation circuit 28 with the cumulative arithmetic operation values read out from the high speed memory 21. Meanwhile, the high speed memory 21 is switched over from a read mode to a write mode and the results of summing by the adder 23 are written into the address WA1. The cumulative arithmetic operation for the window W1 is completed in this fashion.

When the cumulative arithmetic operation for the entire frame is completed, the CPU 15 reads out the cumulative arithmetic operation values from the high speed memory 21 for each of the windows, and carries out the arithmetic operation given by equations (23) and (24) to obtain the center of gravity of the picture image included in each of the windows.

Figure 11:
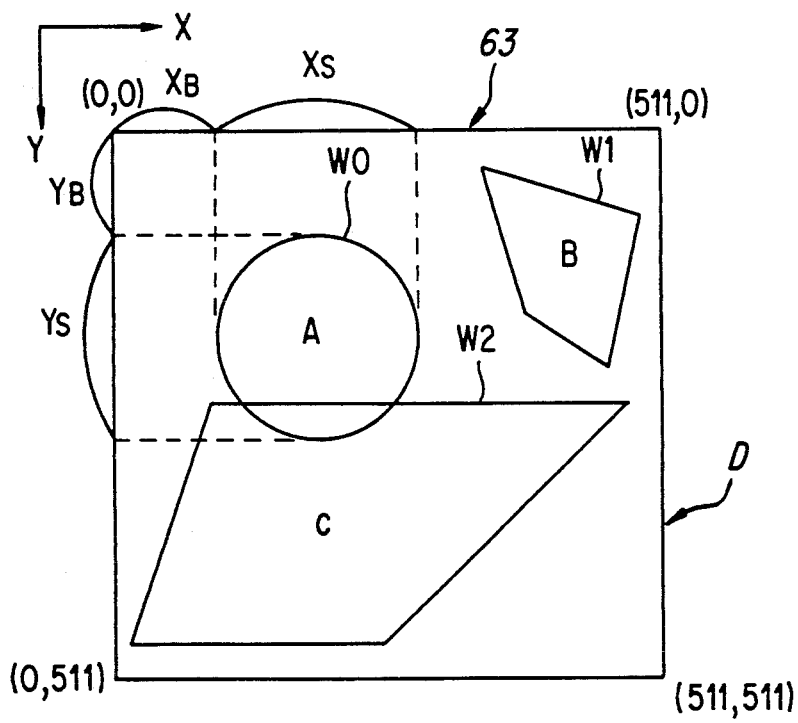
FIG. 11 is a front view showing how picture images of objects can be drawn on a frame without modifying their relative positions to describe the operation of a third embodiment of the present invention.
Figure 12:
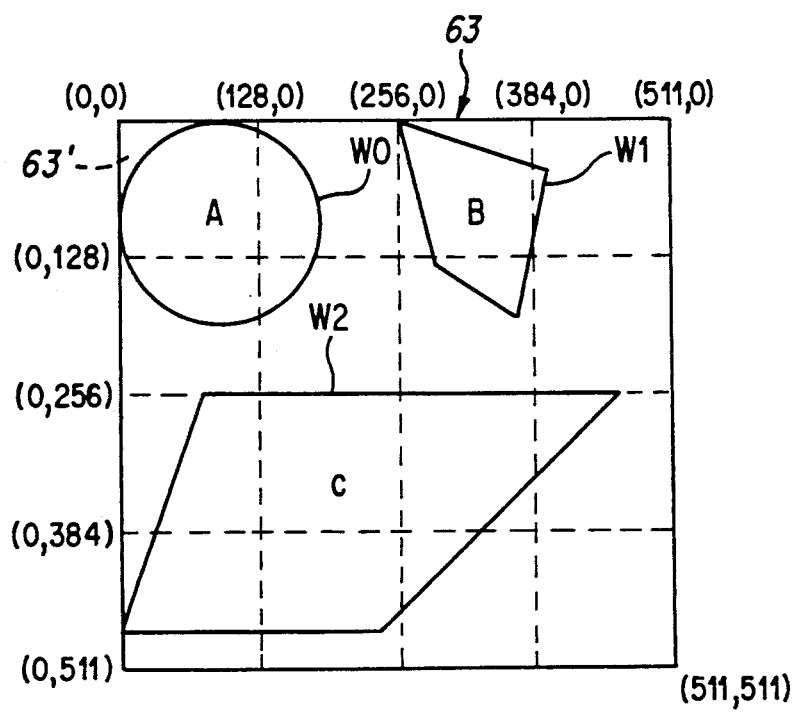
FIG. 12 is a front view showing how picture images of objects can be drawn on a frame according to the third embodiment of the image processing system according to the present invention.

FIG. 12 shows the arrangement of a plurality of windows in the window memory according to a third embodiment of the present invention as opposed to FIG. 11 which shows the arrangement of the windows in the window memory as an exact copy of the physical geometrical arrangement of the windows in a single frame.

According to the present embodiment, as shown in FIG. 12, the entirety of the window memory 63 for each frame D is divided into 16 parts or 16 windows 63', and the window memory 63 is divided into 16 sections so as to correspond to them in a one-on-one relationship.

In this case, objects A, B and C are defined so as to be covered by the sections of the memory 63 corresponding to the various windows from the upper left corner of the frame without any regards to their real physical coordinates. In other words, data is written into each of a plurality of rectangular parts of the frame encompassing the associated windows 63', and the picture images of the objects A, B and C are written into the subsequent vacant windows 63' in a sequential manner.

To carry out a measurement process on each of the objects A, B and C, the following parameters are stored for each of the windows 63'.

(1) The coordinate of the upper left corner of the rectangle encompassing the window
—$X_B$, $Y_B$ in the case of WO in FIG. 1 —;
(2) The size of the rectangle encompassing the windows
—$X_S$, $Y_S$ in the case of WO in FIG. 1 —; and
(3) The starting coordinate of writing data into the memory
—(0, 0) in the case of WO in FIG. 1 —
—(256, 0) in the case of W1 in FIG. 1 —
—(0, 256) in the case of W2 in FIG. 2 —.

Figure 13:
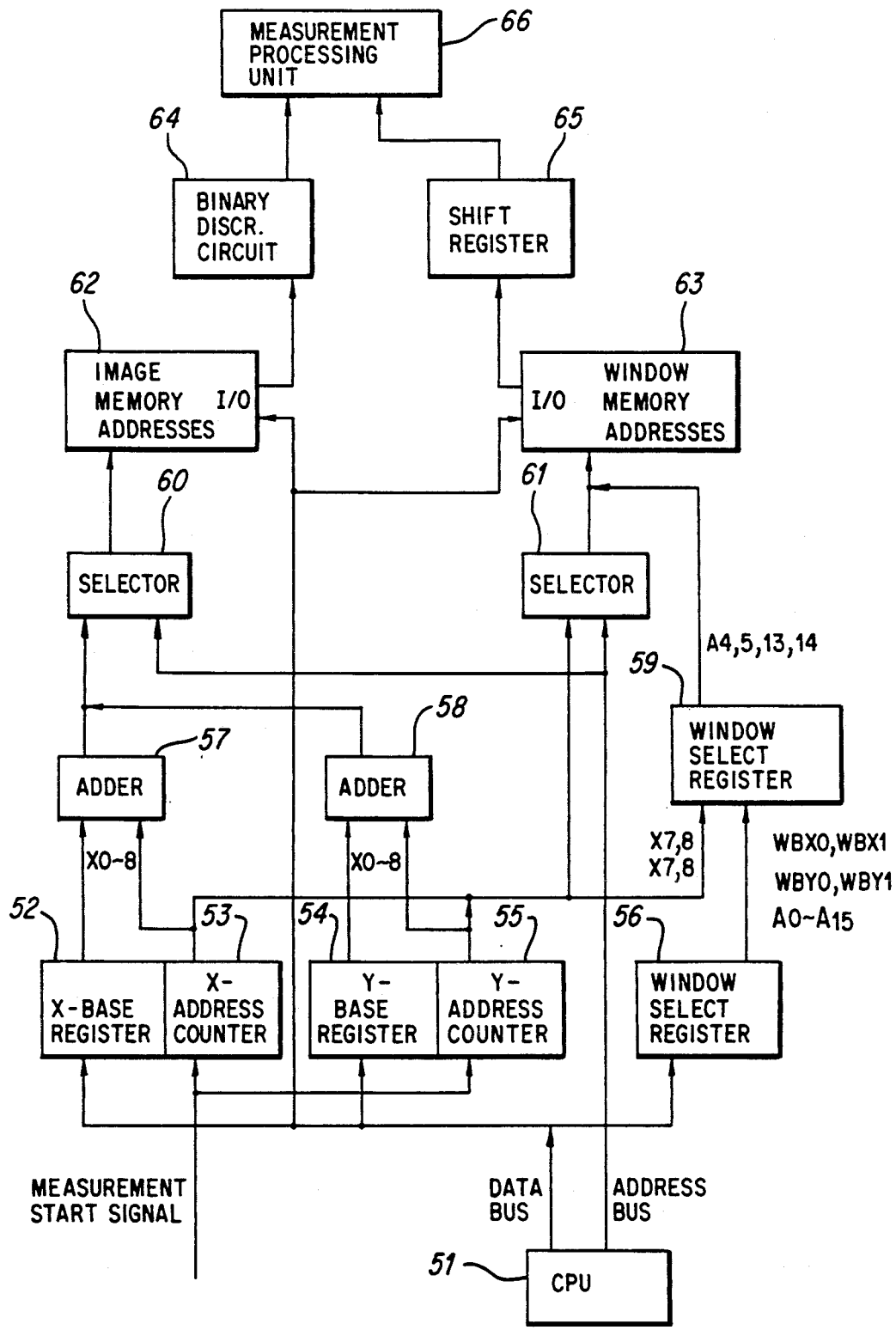
FIG. 13 is a block diagram showing the electric structure of the image processing system according to the third embodiment of the present invention.

FIG. 13 shows the hardware structure for the third embodiment of the image processing system according to the present invention. In this drawing, numeral 51 denotes a CPU, numerals 52, 53, 54 and 55 denote counter means each consisting of a register and a counter for counting X and Y coordinates, numeral 56 denotes a window select register, numerals 57 and 58 denote adders, numeral 59 denotes a window select logic circuit, numerals 60 and 61 denote selectors, numeral 62 denotes an image memory, numeral 63 denotes a window memory, numeral 64 denotes a binary discrimination circuit, numeral 65 denotes a shift register, and numeral 66 denotes a measurement processing circuit. Their functions are now described in the following.

The image memory 62 contains the picture images of the objects A, B and C obtained from an image sensor or the like, and the window memory 63 contains what was written by the CPU 51 according to the plan illustrated in FIG. 12.

Figures 14, 15:
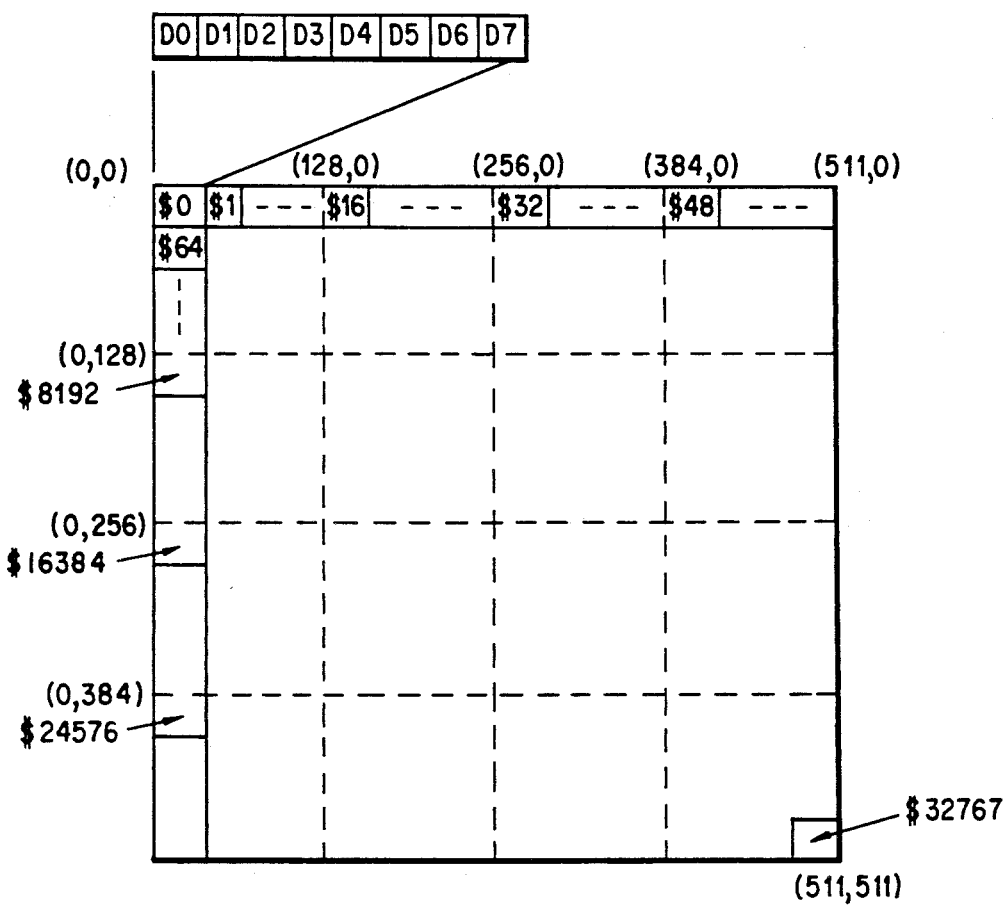

Now the procedure for carrying out a measurement process on each of the windows 63' is described in the following. First of all, the upper left coordinate of the window 63' is written by the CPU 51 into the X base register 52 and the Y base register 54. Then, the start coordinate written by the CPU 51 into the window memory 63 by way of the window select registers 56 and 57 is converted into variables WBXO, WBX1, WBYO and WBY1 as illustrated in FIG. 14. For example, in the case of W1, the output consists of WBXO=0, WBX1=1—, WBYO=0 and WBY1=0.

The X address counter 53 and the Y address counter 55 are activated by a measurement start signal from the CPU 51 or the like, and are each counted up from zero. However, the Y address counter 55 counts up upon completion of the counting process carried out for each horizontal line. The counts are converted into real coordinate values by the X base register 52 and the Y base register 54, by cooperation with the adders 7 and 8, respectively, and are outputted as address signals for the image memory 62.

Meanwhile, the address count values for X and Y take out data from the window memory 63 as address signals for the window memory 63. Since a part of the addresses of the window memory 63 are required to be modified depending on where the window 63' is located in the frame, the contents of the window select register 56 and the address counter 53 are modified by the window select logic circuit 59 before they are used as the address signal for the window memory 63.

The data of the image memory 62 is converted into binary values by the binary discrimination circuit 64 while the data of the window memory 63 is converted into serial data by the shift register 65, before these two sets of data are processed by the measurement processing unit 66.

Now the structure of the window memory 63 and the details of the window select logic circuit 59 are described in the following. As shown in FIG. 15, the window memory 63 is allocated with 8-bit addresses.

When only the X-direction is considered and data is to be read out from (128, 0), since it must be started from the 16th address of the window memory 63, A4 must be set to "1". In other words, when data is to be read out from (256, 0), A5 must be set to "1", and when data is to be read out from (384, 0), both A4 and A5 must be set to "1". Also, the values of A4 and A5 must be rewritten every time the address count value (XO through 7) in the X direction passes 128 or, in other words, every time the bit of X7 is reversed.

Figure 18:
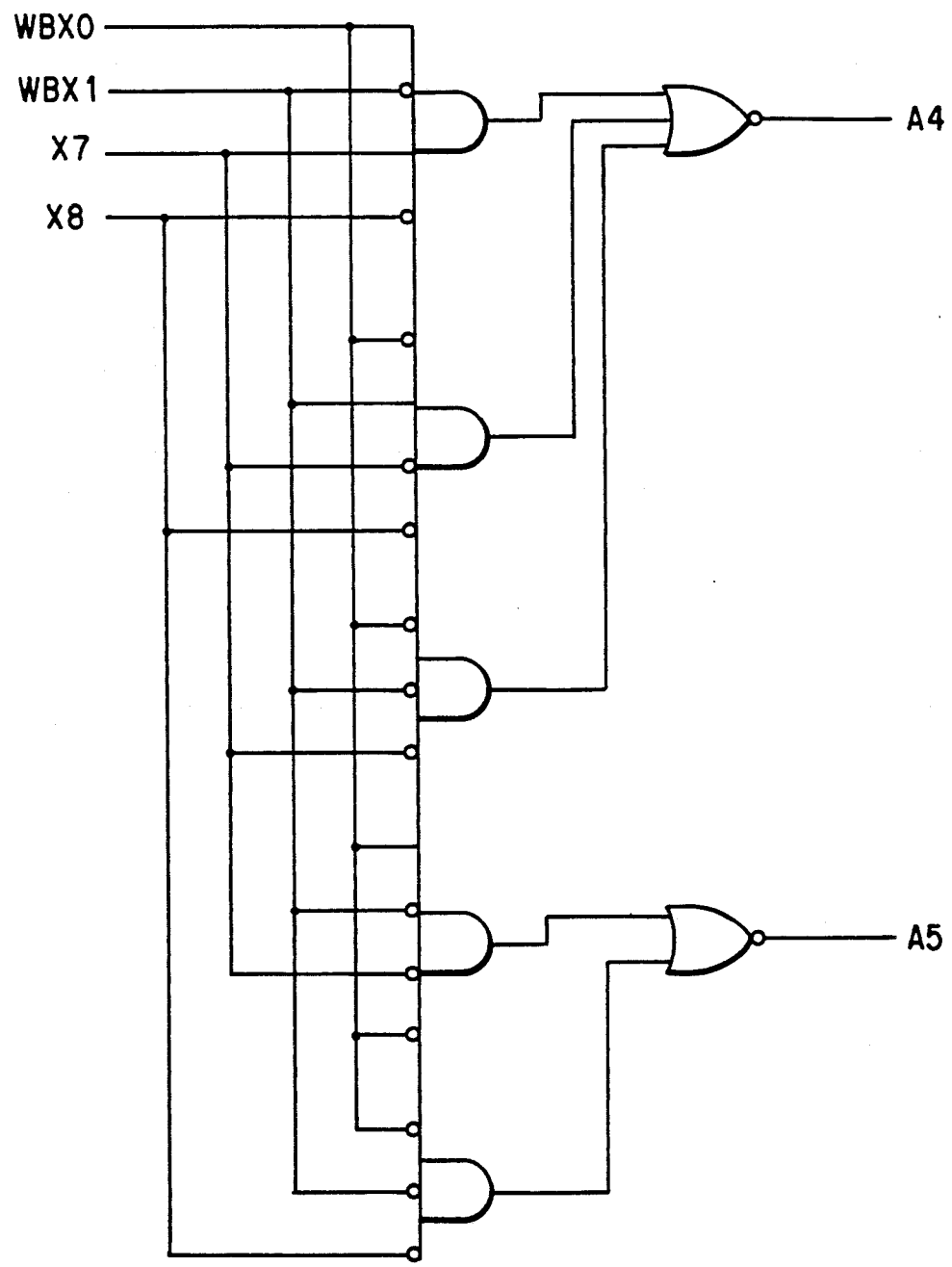
FIG. 18 is a circuit diagram showing how a window select logic circuit can be implemented according to the table of FIG. 16.

The values of A4 and A5 for all the possible combinations are listed in the table of FIG. 16. In this table, "—" denotes that this entry is a non-existent possibility. Likewise, in regards to the Y direction, A13 and A14 change as given in FIG. 7. FIG. 18 shows how the window selector logic circuit can be implemented according to the table in FIG. 16. In regards to the Y direction, a corresponding logic circuit can be obtained by changing WBXO into WBYO, WBX1 into WBY1, X7 into Y7, X8 into Y8, A4 into A13, and A5 into A14.

As shown in the above described embodiment, according to the image processing system of the present invention, since picture images of a plurality of objects can be written into a single window memory 63, it becomes unnecessary to rewrite the contents of the window memory 63 even when measurements are to be carried out on the picture images of the objects written into the respective windows 63, the required capacity of the window memory can be reduced, and the processing speed for the measurement process can be increased.

Furthermore, if a plurality of conformal windows located in different coordinates are defined, it becomes possible to carry out a measuring process by writing a picture image into only one of the windows.

Figure 19:
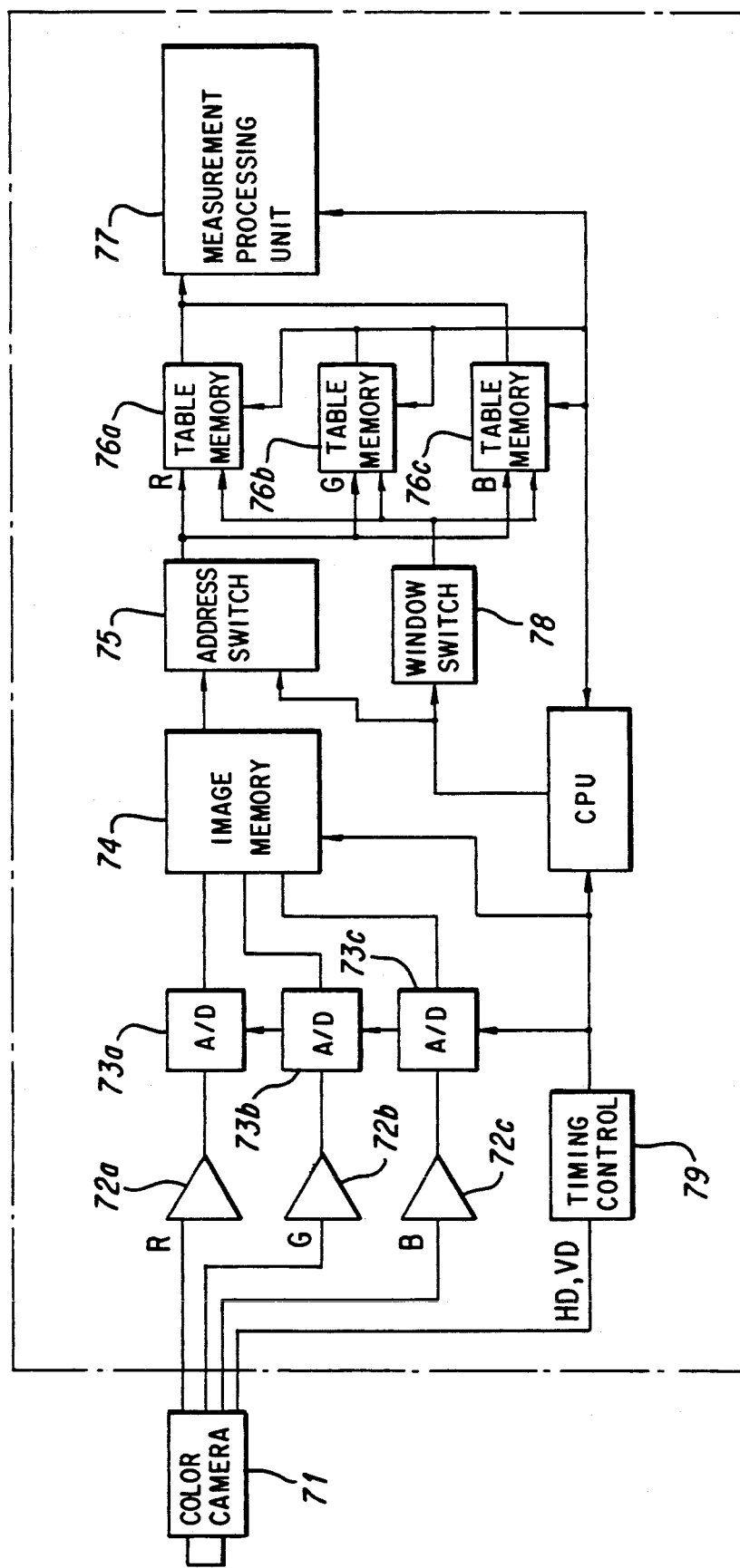
FIG. 19 is a block diagram showing the electric structure of a color image processing system constructed as a fourth embodiment of the present invention.

FIG. 19 is a block diagram of a color image processing system based on a gradation extraction system constructed as a fourth embodiment of the present invention. Referring to FIG. 19, numeral 71 denotes a color camera serving as gradation input means, and the gradation signals for red R, green G and blue B of an object (not shown in the drawing) obtained by this camera are amplified by amplifiers 72a through 72c, respectively.

Figure 20:
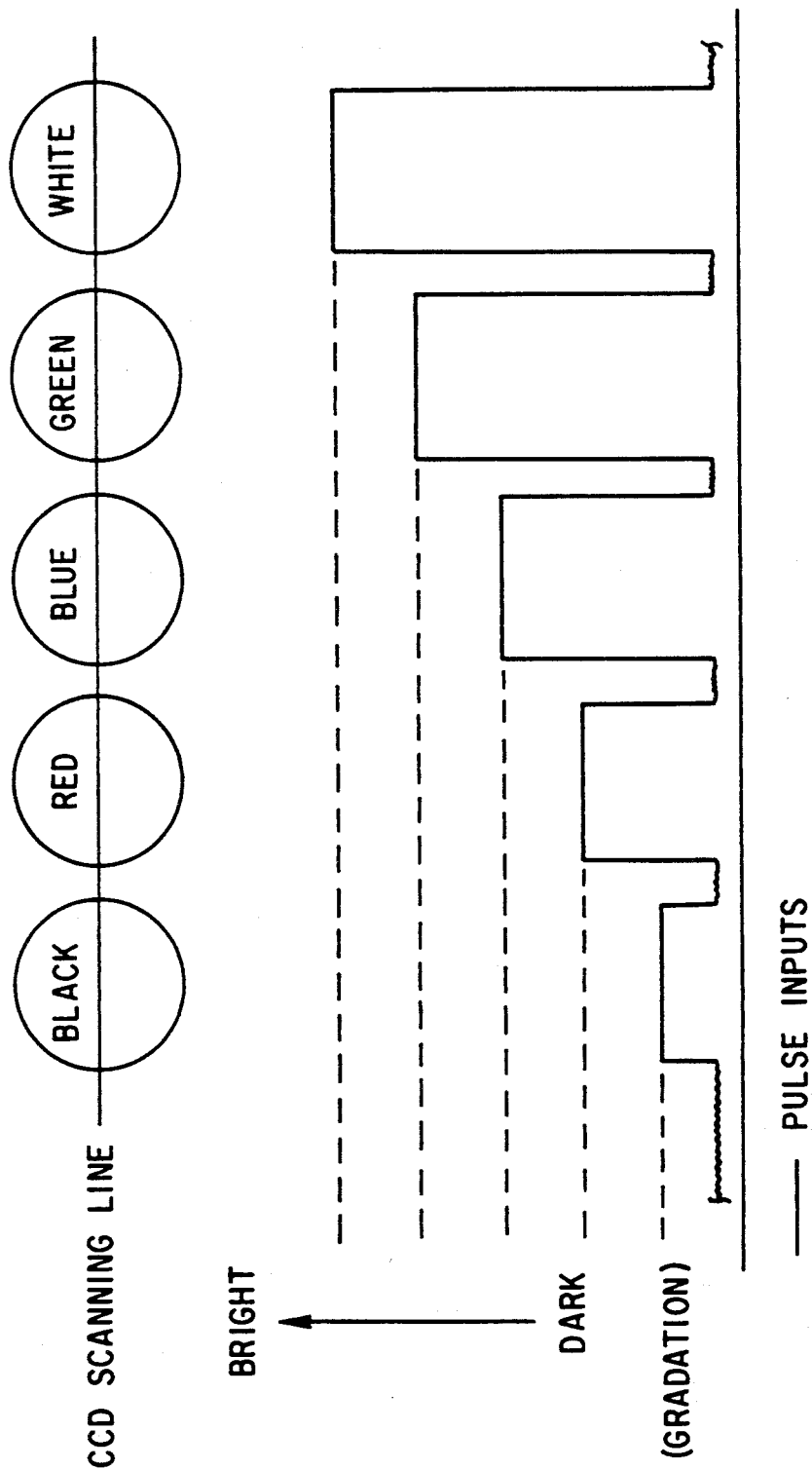
FIG. 20 is a pulse wave form diagram showing gradation level of typical colors.

The gradation signals amplified as analog signals are converted by A/D converters 73a through 73c serving as A/D conversion means into digital signals. The gradation signals converted into M bit digital signals by the A/D converters 73a through 73c are stored in an image memory 75. FIG. 20 show the general characters of the different gradation levels.

Synchronization signals (HD, VD) are supplied to a timing control unit 97.

Figure 21:
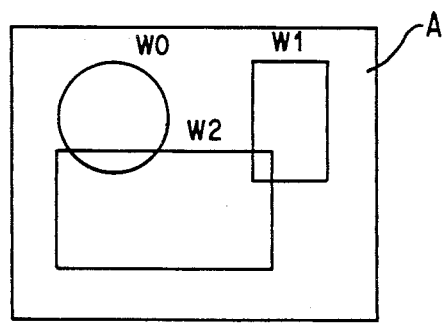
FIG. 21 is a front view showing an example of display of an object in a frame.
Figure 22:
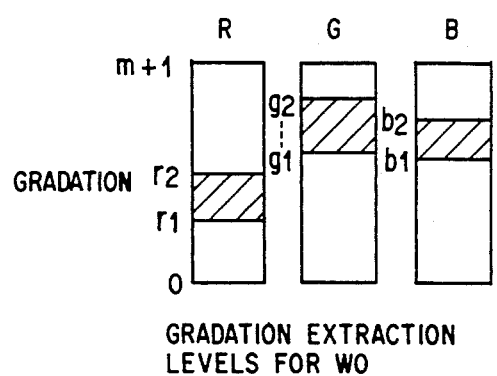
FIG. 22 is a diagram of gradation levels showing how extracted gradation levels are inputted.

Meanwhile, as shown in FIG. 21, a plurality of windows $W_0$ through $W_2$ are defined in a single frame of a display unit A such as a CRT display unit. In other words, in regards to the window WO, as shown in FIG. 22, a range of gradation level between r1 and r2 is extracted for the red R signal, a range between g1 and g2 is extracted for the green G signal, and a range between b1 and b2 is extracted for the blue B signal. The gradation level ranges can be freely selected without being limited by the example given herein, and may each consist of a plurality of parts.

Figure 23:
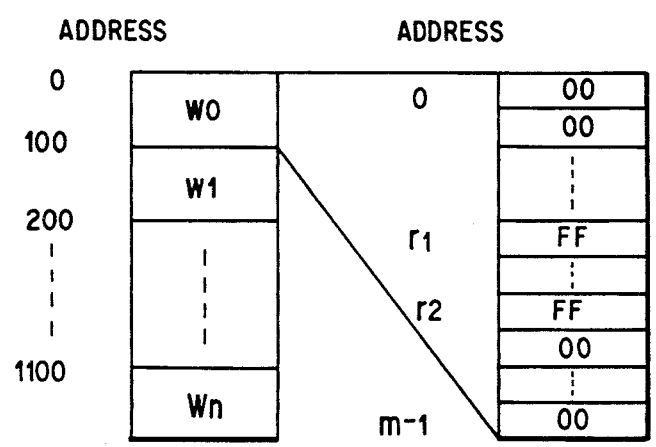
FIG. 23 is a memory map showing the contents written into and stored in the table memories according to the fourth embodiment of the present invention.

In FIG. 19, numerals 76a through 76b denote table memories, and, when data on the object is inputted to these memories, those addresses which are to be extracted contain $FF and the remaining addresses contain $00 as shown in FIG. 23. The written values as well as the number of data bits can be free selected according to each particular system. Likewise, extraction levels can be freely selected for the other windows, and data is written from a lower address to a higher address as shown in FIG. 23.

The table memories 76a through 76c are defined in such a manner that the gradation data obtained from the image memory 74 may be inputted into the table memories 76a through 76c for red R, green G and blue B by placing the address switching unit 75 under the command of the CPU 80 and thereby switching over the window from which gradation levels are to be extracted, and gradation signals representing the gradation levels of the object can thus be outputted.

Based upon the gradation data obtained from the thus extracted gradation signals, the precise area, gravitational center and other features of the object are measured. When the process on the window 0 is completed, the subsequent windows can be measured by switching over the window switching unit 78 in a sequential manner.

In this way, even when the differences in the gradation level is small depending on the background, the sunlight and slight difference in gradation levels of parts of similar colors, it is possible to accurately grasp the gradation levels of the object to be inspected, and the overall picture of the object. Furthermore, since an object is recognized for each of a plurality of windows in a single frame, a plurality of windows can be superimposed one over the other thereby providing improved precision and convenience. Moreover, since the extraction of gradation levels can be carried out by a CPU, a high speed extraction is made possible, and the circuit structure is simplified.

Figure 24:
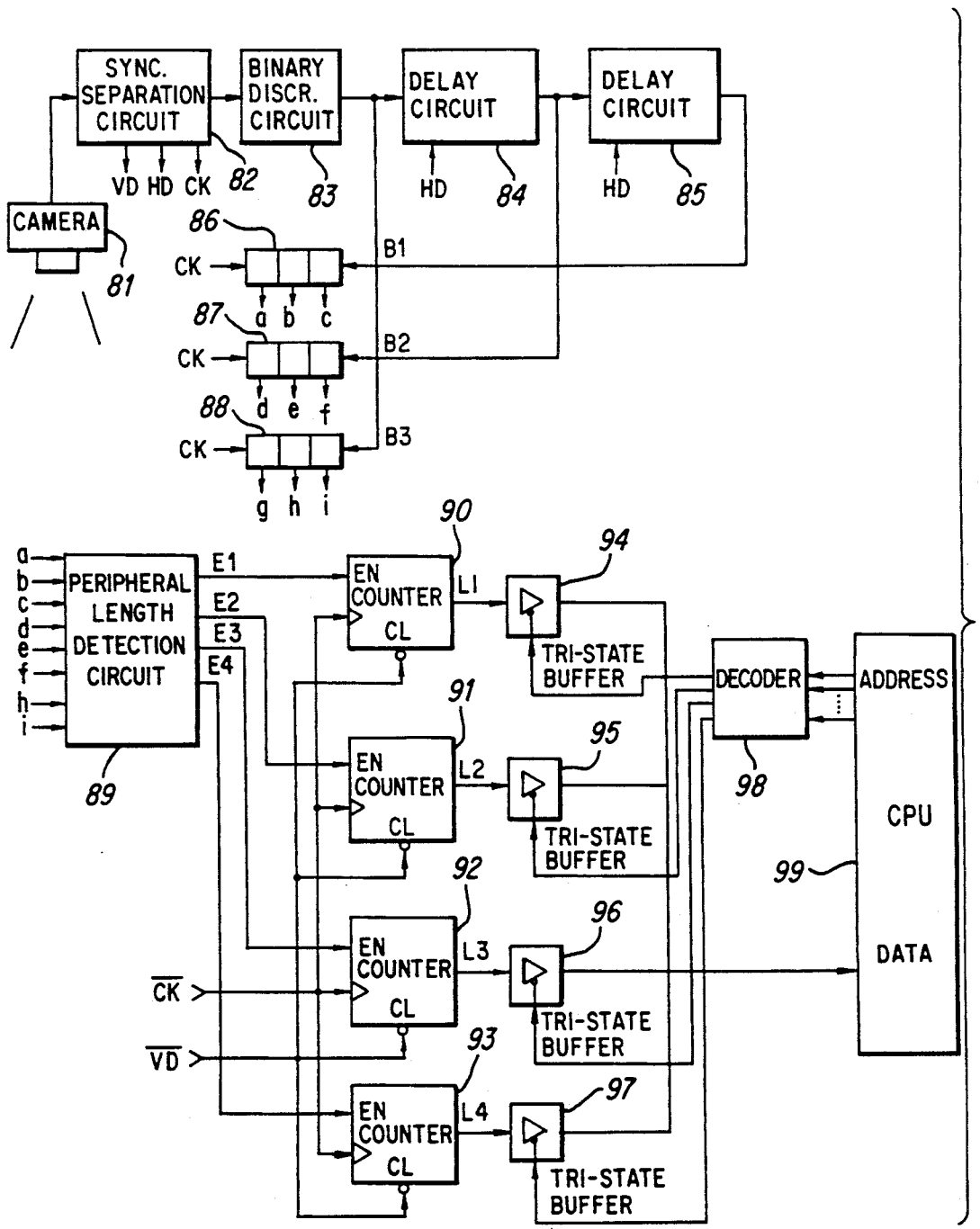
FIG. 24 is a block diagram showing the electric structure of an image processing system constructed as a fifth embodiment of the present invention.

Referring to FIG. 24 illustrating the hardware structure according to a fifth embodiment of the present invention in a highly simplified fashion, numeral 81 denotes a camera which can take the pictures of stationary or moving objects and produces a video signal representing the distribution of different gradation levels in an analog form. Numerals 82 and 83 denote a synchronization signal separation circuit and a binary discrimination circuit for converting the analog video signal into a set of digital data accompanied by synchronization signals required for reproducing the original picture image by electronic means.

Numerals 84 and 85 denote single horizontal scanning line delay circuits, and numerals 86 through 88 denote shift registers. Numeral 89 denotes a peripheral length detection circuit, and numerals 90 through 93 denote counters. Numerals 94 through 97 denote tri-state buffers, and numerals 98 and 99 denote a decoder and a CPU, respectively.

Now the operation of this system is described in the following with reference to FIGS. 24 through 28.

The output from the vide camera 81 is supplied to the synchronization signal separation circuit 82 and the binary discrimination circuit 83. The synchronization signal separation circuit 82 separates a horizontal synchronization signal HD and a vertical synchronization signal VD from the video signal, and generates a clock signal CK. The video signal representing the gradation distribution of the picture image is converted into a set of binary data by the binary discrimination circuit 83 according to a predetermined threshold level. Thus obtained binary signal is then supplied to the three shift registers 81, 82 and 83, directly, via on of the single horizontal scanning line delay circuit 84 and via both the single horizontal scanning line delay circuits 84 and 85, respectively. Thus, the first shift register 81 stores the binary video signal B1 which is delayed by two horizontal scanning lines, the second shift register 82 stores the binary video signal B2 which is delayed by one horizontal scanning line, and the third shift register 83 stores the current binary video signal B3. Since each of the shift registers 81 through 83 is provided with three storage locations, a three by three bit pattern consisting of a current bit and eight adjoining bits covering three horizontal scanning line can be obtained. This bit pattern is then supplied to the peripheral length detection circuit 89 which is shown in greater detail in FIG. 27.

Figure 27:
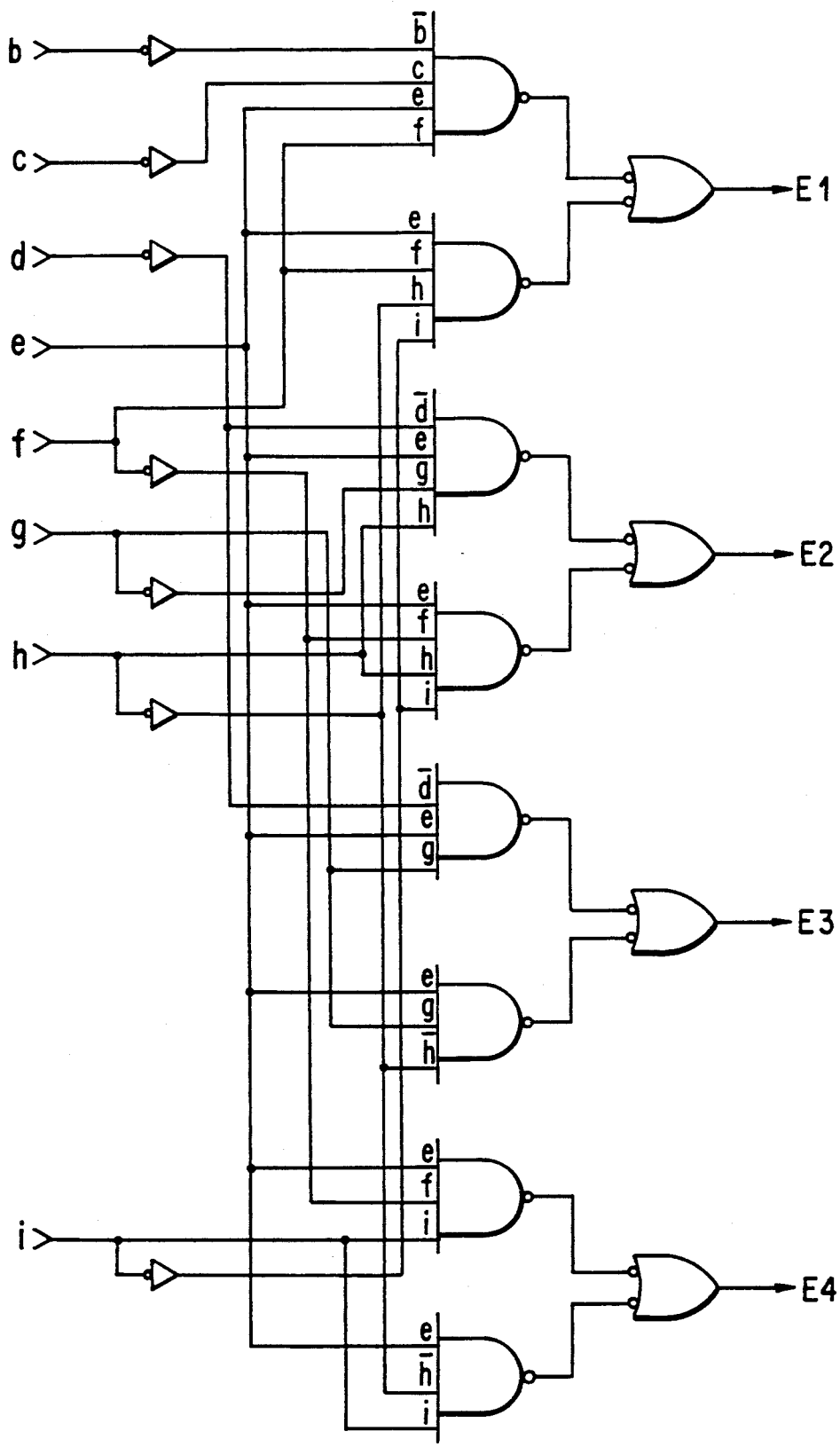
FIG. 27 is an example of the peripheral length measuring circuit according to the present invention.
Figure 28:
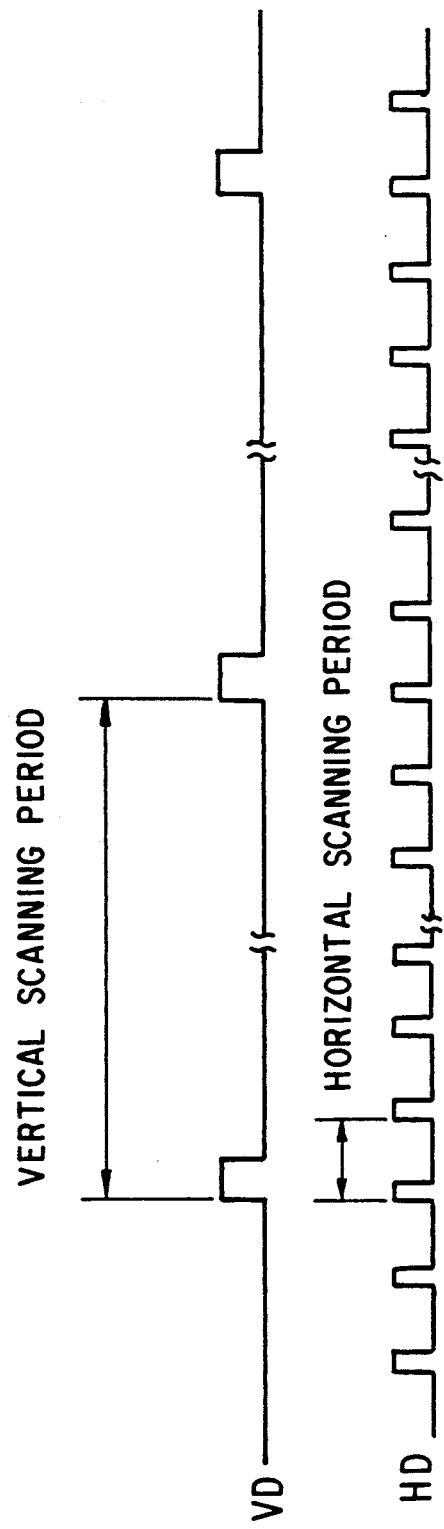
FIG. 28 is a time chart describing the relationship between the horizontal synchronization signal and the vertical synchronization signal according to the present invention.

In the peripheral length detection circuit given in FIG. 27, output E1 is brought to high level when a horizontal component of the peripheral length is detected. Output E2 is brought to high level when a vertical component of the peripheral length is detected. Output E3 is brought to high level when a rightwardly rising component of the peripheral length is detected. Output E4 is brought to high level when a leftwardly rising component of the peripheral length is detected.

Referring to FIG. 24, the output signals E1 through E4 are supplied to enable terminals of counters 90 through 93. These counters 90 through 93 are reset by the inverted signal of the vertical synchronization signal, and receive the inverted sampling clock CK as their count clock. Thus, the outputs of the counters L1 through L4 give the total number of the components of the peripheral length within a single field or over an entire frame. Specifically, the output L1 gives the total number of the horizontal components of the peripheral length, the output L2 gives the total number of the vertical components of the peripheral length, the output L3 gives the total number of the rightwardly rising components of the peripheral length, and the output L4 gives the total number of the leftwardly rising components of the peripheral length.

Figure 25:
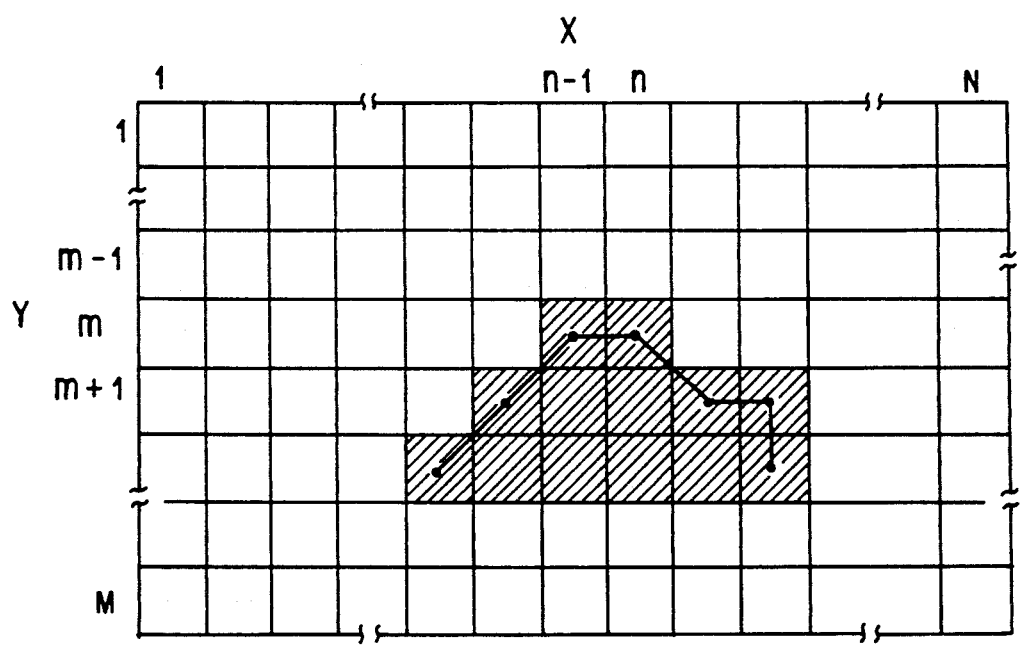
FIG. 25 is a front view showing an example of display of an object in a frame.
Figure 26:
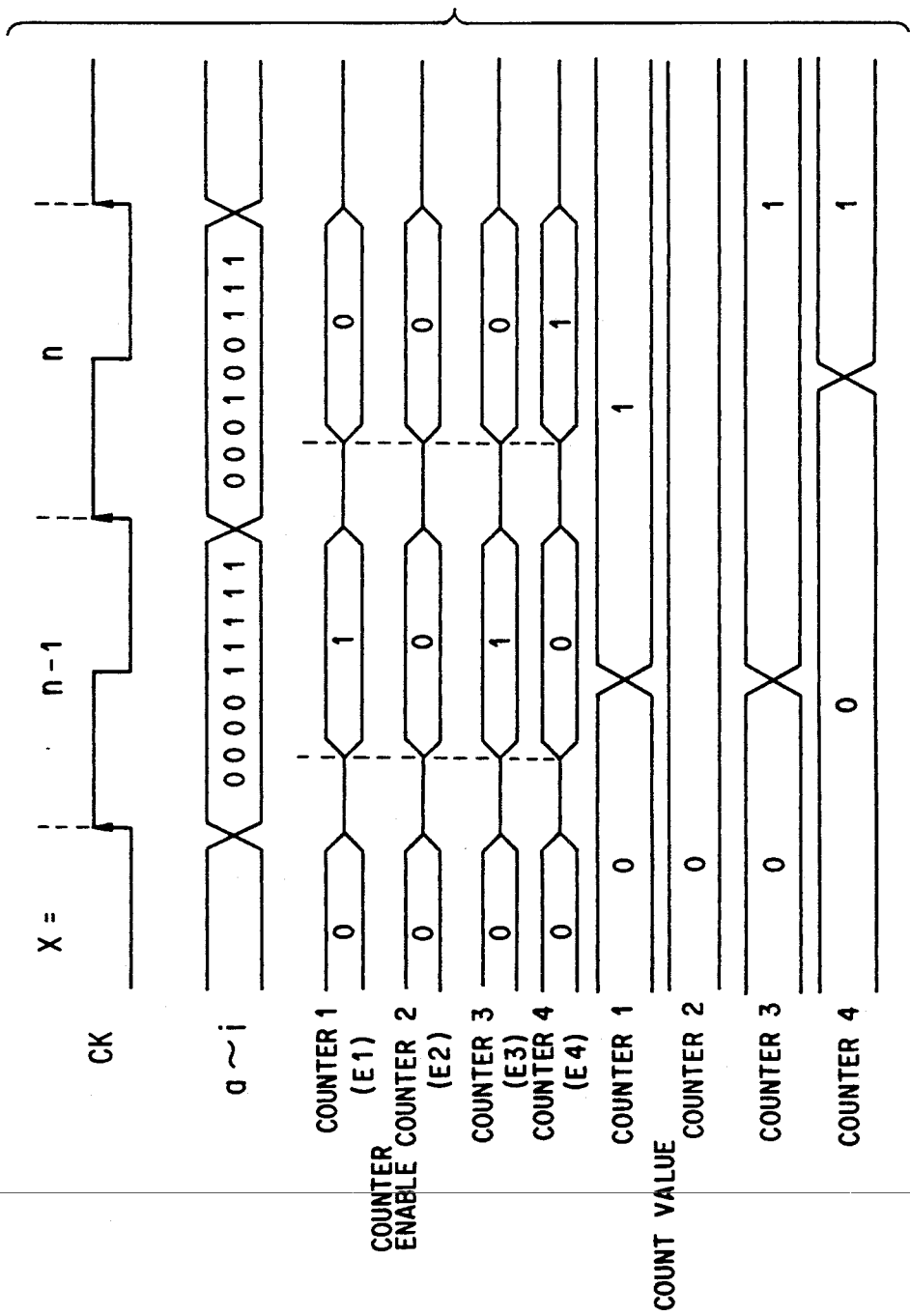
FIG. 26 is a time chart showing the outline of the operation of the fifth embodiment.

FIG. 25 illustrates the binary data image during the process of incrementing the number of the components of the peripheral length, and FIG. 26 is a time chart describing this process.

Referring to FIG. 25, the shaded parts corresponding to the pixels which are occupied by a picture image of interest. Suppose that a first peripheral length component is detected at $X=n-1$ and $Y=m$. As a horizontal component and a rightwardly rising component of the peripheral length exit in the eight adjacent bit pattern, the enable terminal E1 of the counter 90 and the enable terminal E3 of the counter 92 are brought to high level. The outputs of the counters 90 and 92 are both "1" at the subsequent falling edge of the sampling clock CK.

When the center bit of the eight adjacent bit pattern is at Xn and Ym, as there exists only a leftwardly rising component of the peripheral length, the enable terminal E4 of the counter 93 is brought to "1" The output of the counter 93 is "1" at the subsequent rising edge of the sampling clock CK.

In this way, the counters 90 through 93 add up the total numbers of the different components of the peripheral length over a single field of video data or while an entire single frame is scanned. During the period of suppressing the vertical return line, the CPU 99 reads out the values of L1, L2, L3 and L4. Thereafter, the leftwardly and rightwardly increasing components are multiplied by the square root of 2, or the peripheral length of the picture image is obtained according to the following formula:

$$L1 + L2 + \sqrt{2}\,(L3 + L4)$$

The peripheral length detection circuit given in FIG. 27 is only an example, and does not limit the present invention in any way. Thus, depending on the kind of the specific peripheral length detection circuit, the arrangement and number of the counters may change.

Figure 29:
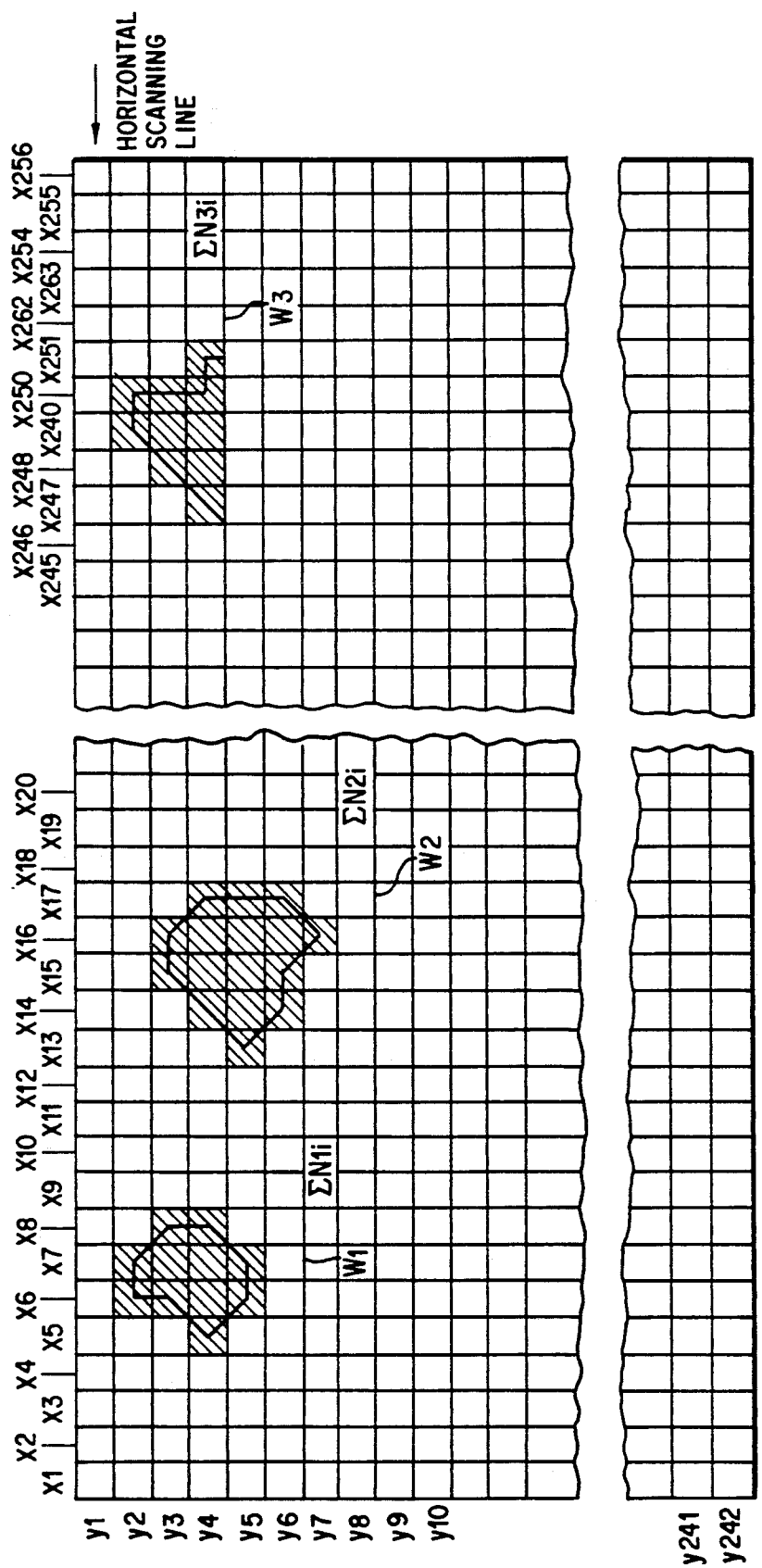
FIG. 29 is a front view showing a plurality of windows defined in a single display frame to illustrate a sixth embodiment of the present invention.

FIGS. 29 through 33 show a sixth embodiment of the present invention. FIG. 29 illustrates three windows W1, W2 and W3 defined in a single frame which consists of 256 by 242 pixels according to the present embodiment. The numbers and locations of the windows can be freely selected. Each window satisfies the following five conditions:

(1) Each window includes at least two by two pixels;
(2) Each horizontally adjacent pair of windows must be spaced from each other by at least one or two pixels;
(3) Each vertically adjacent pair of windows may directly adjoin each other as long as they do not overlap each other;
(4) Each object must be separated from each other by at least one or two pixels along the horizontal direction, and by at least one pixel along the vertical direction; and
(5) Each object is completely encompassed by the associated window (An outer most pixel of an window may coincide with the outer periphery of the associated object.

The present embodiment can measured the peripheral length of the object in each of the windows. The peripheral length is here defined as the total length of the lines connecting the centers of the pixels located along the periphery of each object. In this embodiment also, the different peripheral components are detected by using three by three pixels (eight adjacent bits pattern) and grouped into horizontal components (H), vertical components (V), rightwardly rising components (R), and leftwardly rising components (L).

When the window W1 is considered, $H11=V11=L11=1$ and $R11=0$ for a horizontal scanning line y2, $H12=L12=0$ and $V12=R12=1$ for a horizontal scanning line y3, $H13=V13=0$ and $R13=L13=1$ for a horizontal scanning line y4, and $H14=1$ and $V11=L11=R11=0$ for a horizontal scanning line y5. Therefore, the peripheral length of the picture image in the window W1 is given as follows:

$$\begin{aligned}\Sigma N1j &= \Sigma H1j + \Sigma V1j + \sqrt{2}\,(\Sigma R1j + \Sigma L1j)\\ &= (1+0+0+1)+(1+1+0+0)+\\ &\quad \sqrt{2}\,\{(0+1+1+0)+(1+1+0+0)\}\\ &= 4 + 4\sqrt{2}\,.\end{aligned}$$

The peripheral lengths of the picture images in the other windows W2 and W3 can be computed in similar fashions.

The above described process can be summarized as given in the following:

(1) The different peripheral length components are detected and grouped into horizontal components (H), vertical components (V), rightwardly rising components (R), and leftwardly rising components (L) by evaluating picture image data over two adjacent horizontal scanning lines, and are individually added up for each of the windows;

(2) The numbers of the data in the different component groups are individually added up for each of the windows; and (3) The peripheral length of the picture image in each of the window is obtained according to the following formula:

$$\Sigma Nki = \Sigma Hki + \Sigma Vki + \sqrt{2} \, (\Sigma Rki + \Sigma Lki) \quad (27)$$

where k denotes each window and i denotes each horizontal scanning line.

Reading of data from the camera is carried out along the horizontal scanning line, and the current scanning line moves sequentially downwards. Since each horizontal scanning line may pass through a plurality of windows (for instance W1 and W3 along the horizontal scanning line y2), detection of horizontal components (H) must be carried out for each of the windows, and different windows located along a same horizontal scanning line must be distinguished one from the other. To this end, a vertical address table as shown in FIG. 30(A) and a window table as shown in FIG. 30(B) are provided. The window table stores the pattern of the crossing of the windows by the horizontal scanning line in the order of each occurrence, and if a plurality of horizontal scanning lines have a same pattern they may share this same pattern. In the window table, the two storage areas in the starting addresses WT1 and WT1+1 store the pattern of the appearance of the windows on the horizontal scanning line from the beginning. This pattern data specifically consists of the peripheral length area addresses (WA1, WA3, etc.) as will be described hereinafter. In the window table, a plurality of storage areas for storing at least on sequential pattern are assigned with consecutive addresses. The vertical address table is provided with the same number of storage areas as the number of the horizontal scanning lines, and these storage areas are assigned with consecutive addresses.

According to the present embodiment, address 1 through 242 are assigned to the storage areas for the first through 242nd horizontal scanning lines. Each storage area stores the start address (such as WT1, WT2, etc. shown in FIG. 30 (A))of the storage areas of the window table containing the pattern of the sequential appearance of windows along the associated horizontal scanning line. The addresses of the vertical address table is incremented by the count of a vertical counter counting the pulses in the horizontal synchronization signal.

In order to execute step (2) or the process of counting the four different peripheral length components for each of the windows, peripheral length storage areas are defined as illustrated in FIG. 30(C) for storing the numbers of the four different peripheral length components for each of the windows. In these storage areas, the first address WA1 corresponds to the first window W1, and includes four storage areas for storing the four different peripheral length components. The second and the third addresses WA2 and WA3 likewise correspond to the second and third windows W2 and W3, respectively, and each of them includes four storage areas for storing the four different peripheral length components.

Referring to FIG. 30(B), the window table preferably stores data indicating whether the picture image in each particular window is given by a black level or a white level. In other words, the output signal of the camera consists of two levels, a white level and a black level, and the pixels of either a black or a white level are used as a basis for defining the peripheral length. This data may be used to control a white and black reversion circuit which will be described hereinafter.

Before describing the specific structure of the image processing system of the sixth embodiment, the overall operation during each field of data is summarized in the following.

Figure 31:
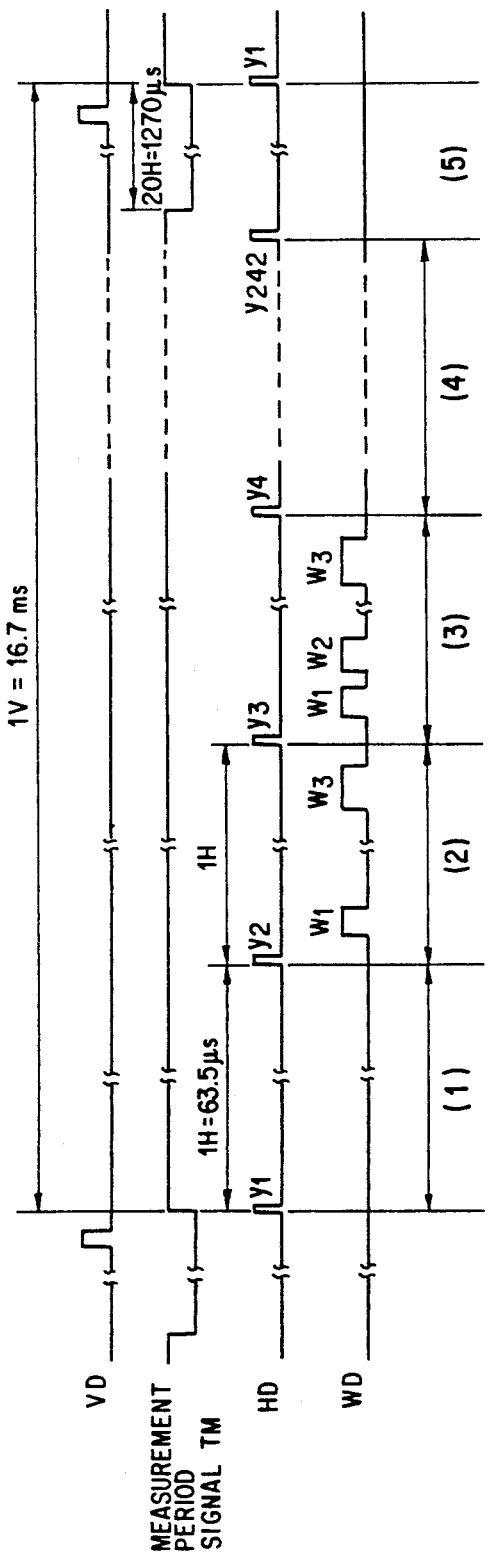
FIG. 31 is a time chart showing the outline of the operation of the sixth embodiment during a single field period.

FIG. 31 shows a vertical synchronization signal VD, a measurement period signal, a horizontal synchronization signal HD, and a window signal WD. The window signal WD is synchronized with the scanning in the camera, and is produced from a window memory after the delay of a single horizontal scanning to indicate the positions of the windows for each of the horizontal scanning lines. In the first horizontal scanning period or along the first horizontal scanning line, the peripheral lengths components of the picture image located on the first and second horizontal scanning lines are detected. According to the present embodiment, there is no window on the first horizontal scanning line y1. In other words, when the vertical counter is incremented to the value 1 by counting the horizontal synchronization signal (horizontal scanning line y2 which is one scanning line behind the current horizontal scanning line in the camera), since the storage area of the vertical address table defined by this address contains no data, no window is detected and the above mentioned computation is not carried out.

In the second scanning period (horizontal scanning line y2), the vertical counter is incremented to the value 2. The storage area of the vertical address table addressed by this value stores address data WT1. Therefore, the storage area of the window table at the address WT1 is looked up and the addresses WA1 and WA2 are stored in that order.

When the window signal rose to the high level for the first time, it can be known that its corresponds to the window W1 at the address WA1 from the above mentioned sequential pattern, and it can be also known from black and white level data not shown in the drawing that pixels of either the black or the white level are to be evaluated. Therefore, as long as the window signal for the window W1 remains at high level, the pixels of black level are computed. When the window signal has dropped to low level, the computed values are added up to the cumulative values of the peripheral length components at the address WA1.

When the window signal has risen again to high level, it can be seen from the sequential pattern that it corresponds to the window W3. Likewise, as long as the window signal for the window W3 remains at high level, the pixels of black level are computed. When the window signal has dropped to low level, the computed values are added up to the cumulative values of the peripheral length components at the address WA3.

This process is repeated for the third through the 242nd horizontal scanning lines, and the cumulative values of the peripheral length components are computed for each of the windows appearing along the horizontal scanning lines. When this process is carried out on the last or the 242nd horizontal scanning line, the cumulative values contained in their respective peripheral length storage areas amount to their final cumulative sums.

Figure 32:
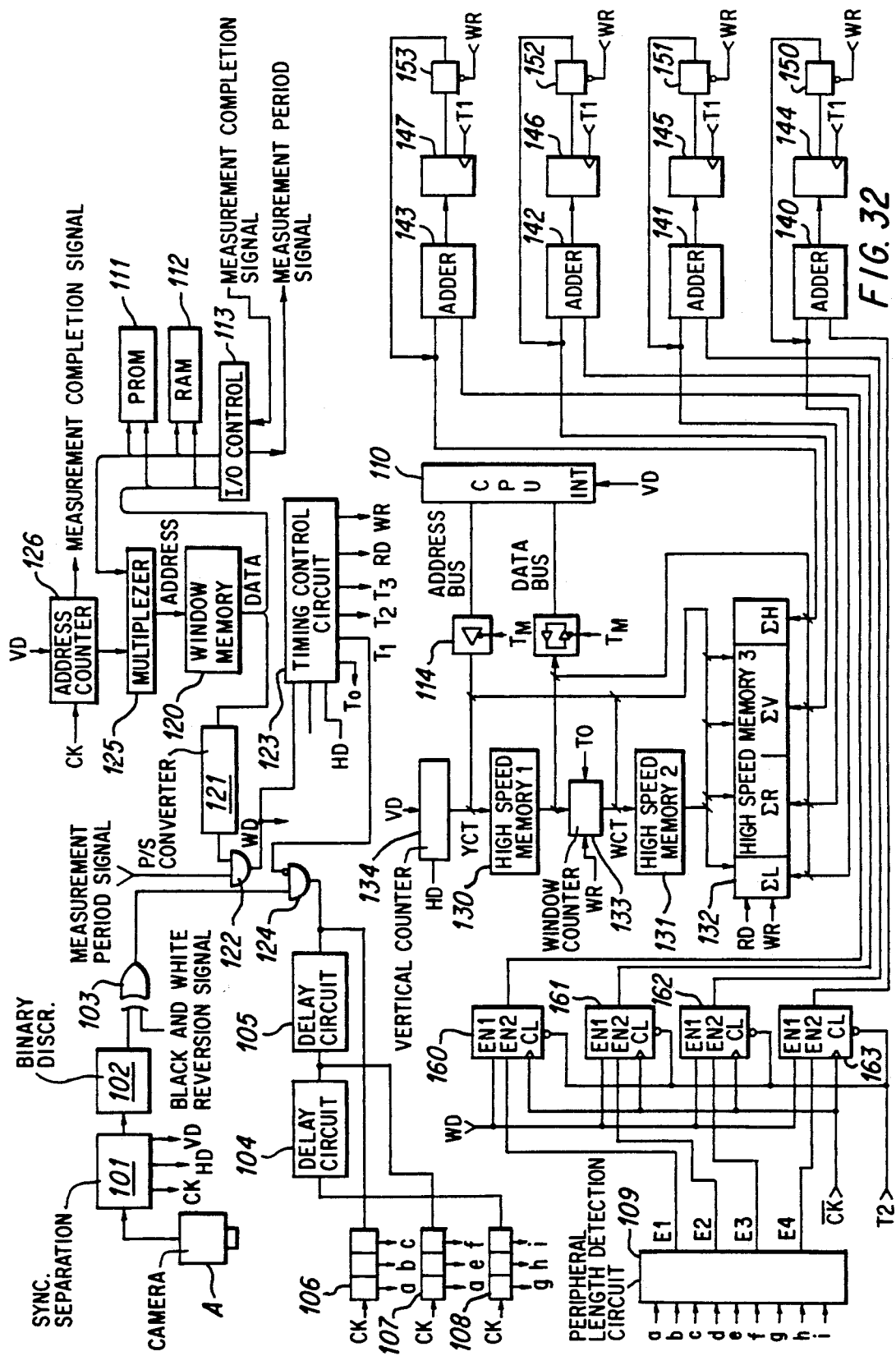
FIG. 32 is a block diagram of the hardware for the sixth embodiment.
Figure 33:
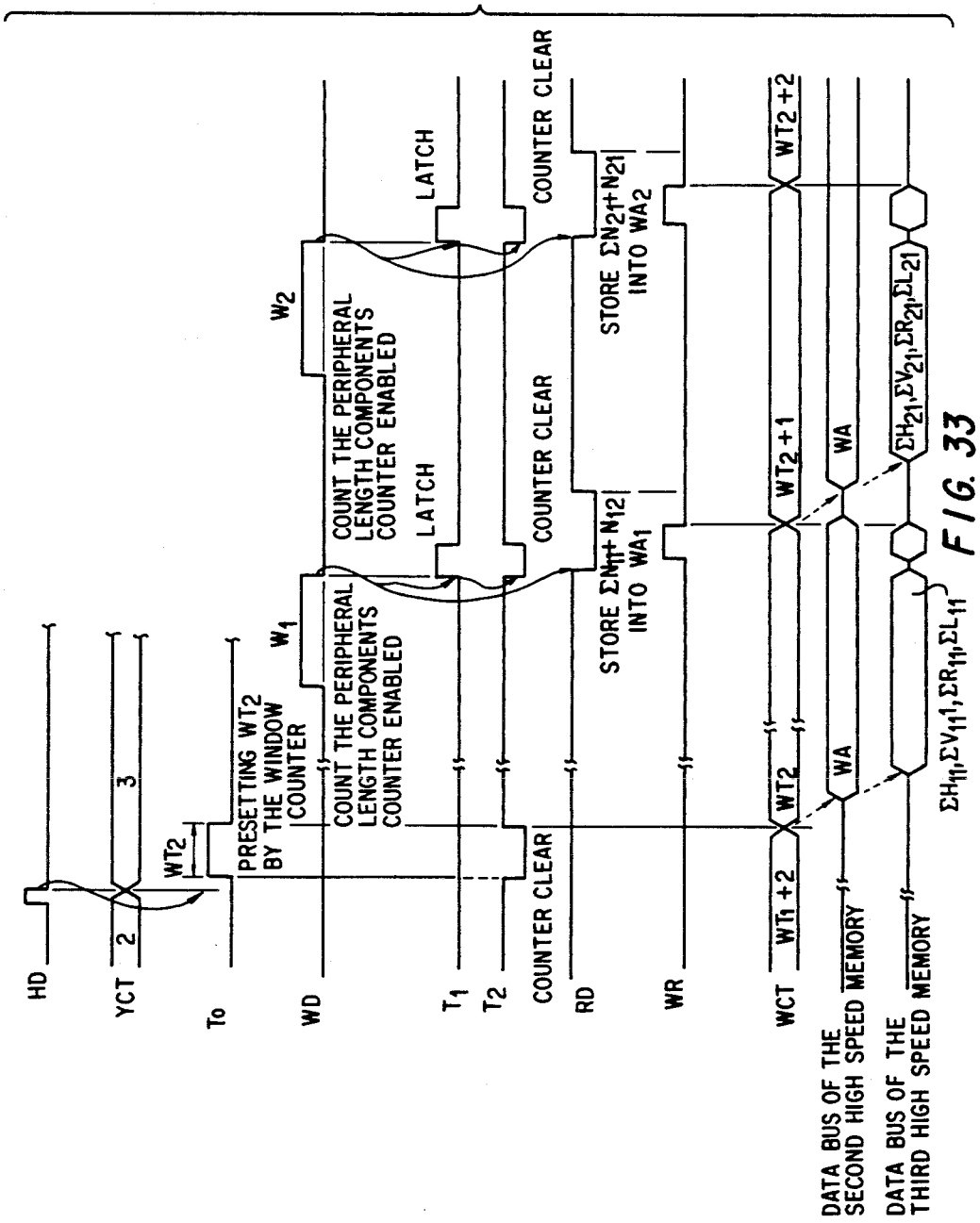
FIG. 33 is a time chart for describing the operation of the sixth embodiment.

The measurement period signal remain at high level throughout the time of measurement and computation, and drops to low level from the time of completion of the process related to the last scanning line and until the occurrence of a pulse in the vertical synchronization signal. During the period of low level of the measurement period signal, the peripheral length is computed from the number of the four peripheral length components according to the aforementioned formula. In this way, the peripheral length of the picture image included in each of a plurality of windows can be promptly computed on a real time basis for each field FIG. 32 illustrates the hardware structure of the image processing system according to the sixth embodiment of the present invention, and FIG. 33 shows the mode of its operation in regards to the measurements on the parts of the windows W1 and W2 located on the third horizontal scanning line y3. In FIG., the period of low level between the two windows W1 and W2 is exaggerate for the convenience of illustration.

In FIG. 32, a TV camera 104 obtains a picture image signal which is then supplied to a synchronization signal separation circuit 101. The synchronization signal separation circuit 101 separates a horizontal synchronization signal HD and a vertical synchronization signal from the picture image signal and, additionally, generates clock pulses CK. The picture image signal is then converted in to a binary signal by a binary discrimination circuit 102 according to a certain threshold level. The binary picture image signal is then supplied to a shift registers 106 and a single horizontal scanning line delay circuit 105 via a black and white reversion circuit 103 and a gate circuit 124. The output from the single horizontal scanning line delay circuit 105 is supplied to another shift register 107 and another single horizontal scanning line delay circuit 104. The output from the single horizontal scanning line delay circuit 104 is supplied to yet another shift register 108. The shift registers 106 through 108 are synchronized by the clock pulses CK, and produce a three by three mask pattern (signals a through i). These signals a through i are supplied to the peripheral length detection circuit 109.

The black and white reversion circuit 103 consists of an EX-OR circuit, and is controlled by a CPU 110 according to the above mentioned black and white level data. The peripheral detection circuit 109 is identical to the peripheral detection circuit 89 of the previous embodiment. output El is brought to high level when a horizontal component of the peripheral length is detected; output E2 is brought to high level when a vertical component of the peripheral length is detected, output E3 is brought to high level when a rightwardly rising component of the peripheral length is detected, and output E4 is brought to high level when a leftwardly rising component of the peripheral length is detected. These signals El through E4 are supplied to the enable terminals EN2 of counters 160 through 164.

The counters 160 through 164 individually counts the associated peripheral length components. The enable terminals EN1 of the counters 160 through 164 receive the window signal WD. The clock inputs of the counters 160 through 164 receive the inverted closes signal, and their resets inputs receive timing signal T2.

The window memory 120 is consists of an image memory, and has the capacity to store a set of binary data corresponding to an entire single frame. This memory is partitioned into a plurality of windows as illustrated in FIG. 29.

The bit of the window memory corresponding to each pixels may be addressed by an address signal supplied via a multiplexer 125. The multiplexer 125 selects either the addresses given by the CPU 110 or the addresses given by an address counter 126.

When windows are defined in the window memory 120, their addresses as well as the data which is to be written in to eh data IO terminals of the memory 120 are given by the CPU 110. The window memory 120 is turned into a read mode during the measurement period, and the address counter 126 designates addresses thereof. The address counter 126 is cleared by the vertical synchronization signal VD, and is incremented by the clock pulses CK. When it is indicated by its count that the 242nd horizontal scanning is completed, a measurement completion signal TE is produced. This measurement completion signal TE is supplied to the CPU 110 via an IO control circuit 113. The CPU 110 receives the vertical synchronization signal VD in addition to the measurement completion signal TE, and generates a measurement period signal TM as shown in FIG. 31, and produces it from the IO control circuit 113. When the window memory 120 is in the read mode as mentioned above, the obtained window data therefrom is converted into a serial signal by a P/S conversion circuit 121,a nd is then supplied to a gate circuit 122 as a window signal WD. The gate circuit 122 is controlled by the measurement period signal TM, and permits transmission of the window signal WD during the measurement period. This window signal WD is in synchronism with the image signal from the camera 104 with a delay of one horizontal scanning line. The window signal WD is high in the window regions, and is otherwise low. The window signal WD is supplied to the counters 160 through 163 as well as to the timing control circuit 123.

The timing control circuit 123 generates various timing signals DO, T1 and T2, a read signal RD and a write signal WR according to the input signal, the window signal WD, the horizontal synchronization signal HD, and the measurement period signal TM. The timing signal TO rises to high level for a certain short time interval following the rise in the horizontal synchronization signal HD with a certain time delay (a few clock cycles), and controls a window counter 133. The timing signal T1 rises to high level for a certain short time interval following the rise in the window signal WD either with or without a certain time delay (a few clock cycles), and controls latch circuits 144 through 147. The timing signal T2 falls to low level for a certain short time interval (until the next window is encountered) following the rise of either of the timing signals TO or T1, and serves as a clear signal for the counters 160 through 163. The read signal RD is kept in low level for a certain time interval following the fall in the timing signal T1, and sets a third high speed memory 132 to a read mode while its level is high. The write signal WR remains at low level for a certain time interval (which is sufficient to write data into the memory) while the read signal RD is at low level, and sets the third high speed memory 132 to a write mode on the one hand and enables the gate circuits 150 through 153 while its level is low. A first high speed memory 130 stores the vertical address table, a second high speed memory 131 stores the window tale, and the third high speed memory 132 stores the peripheral length storage areas.

The CPU 110 carries out the address designation for the high speed memories 130, 131 and 132 as well as the writing of the address data (such as WT1 and WT2) into the vertical address table before the start of a measurement process, the writing of the sequential pattern consisting of the address data (such as WA1 and WA2) into the window table, the clearing of the cumulative values of the peripheral length components into the peripheral length component storage areas, and the reading of the final cumulative sums of the peripheral length components upon completion of the measurement process. During each measurement process, the high-speed memories 130 and 131 are always in a read mode.

The vertical counter 134 is cleared by the vertical synchronization signal at the beginning of each measurement period, and thereafter counts pulses of the horizontal synchronization signal HD and produces an address signal YCT which is then supplied to the first high speed memory 130. The window counter 133 presets the address data (such as WT1 and WT2) read out from the first high speed memory 130 by the address signal YCT, and is thereafter incremented by each rising edge of the write signal WR. The high speed memory 131 produces storage area addresses (such was WA1 and WA3) according to the address designation (such as WT1 and WT1+1 by the output of the window counter 133. The high speed memory 132 carries out the read and write of the cumulative data of the peripheral length components according to the address designation by the output from the high speed memory 131.

Adders 140 through 1433 add up the counts of the counters 160 through 163 to the cumulative values read out from the third high speed memory 132, and the results of the additions are given to latch circuits 150 through 153 before they are routed back to the peripheral length storage areas of the third high speed memory 132.

The CPU 110 comprises PROM 11 for storing its operation program, RAM 112 for storing the cumulative values of the peripheral length components and other data obtained during the course of the computation processes, and the aforementioned IO control circuit 113. The CPU 110 carries out the writing of window data into the window memory 120, the creation of the various tables in the high speed memories 130 and 131, the clearing of the cumulative values of the peripheral length components stored in the third high speed memory 132, and the reading of the final cumulative sums of the peripheral length components upon completion of the measurement process, to the end of obtaining the circumferential or peripheral length of the object included in each of the windows.

Prior to the start of a new measurement cycle, window data is written into the window memory 120, and the vertical address table and the window table are created and the peripheral length storage areas are cleared in the high speed memories 130 through 132. When a new measurement cycle is started, the counting of the peripheral length components and the cumulative additions are carried out. This process can be describe as given following taking an example in the window W33 on the third horizontal scanning line Y3 as illustrated in FIG. 31.

Prior to the starting of the third horizontal scanning line, the count of the counter 134 is 2. And the cumulative sums of the peripheral length components are given by $\Sigma Hli=H11$, $\Sigma Vli=V11$, $\Sigma Rli=R11$, and $\Sigma Lli=L11$. The count of the vertical counter 34 is WA1+2 which is greater than the address designating the last window on the second horizontal scanning line. When the horizontal synchronization signal HD rises to high level, it is counted by the vertical counter, and its count is increased to 3. This value is given to the first high speed memory 130, and the data WT2 stored at address 3 of the vertical address table stored in the first high speed memory 130 is read out, and is preset on the window counter 138 when the timing signal TO has dropped to low level. The count of the window counter 138 is now WT2.

The output WT2 of the window counter 138 designates the associated address of the second high speed memory 131, and the third high speed memory 132 produces the data WA1 (area address) stored at the address WT2. Further, the third high speed memory 132 is accessed at the address WA1, and produces the cumulative peripheral length components data $\Sigma Hli=H11$, $\Sigma Vli=V11$, $\Sigma Rli=R11$, and $\Sigma Lli=L11$.

When the window signal WD has risen to high level, the counters 160 through 163 are enabled by their enable terminals EN2, and the counts of the peripheral length components El through E4 are counted. The counters 160 through 163 are cleared by the timing signal T2. In other words, only the peripheral length components in the window W1 are counted. The counts are given to the adders 144 through 147 for different peripheral length components, and are respectively added to the outputs $\Sigma Hli$, $\Sigma Vli$, $\Sigma Rli$, and $\Sigma Lli$ from the third high speed memory 132. These results are latched onto latch circuits 144 through 147.

Then, the read signal RD goes low level, the write signal risen to high level, the memory 132 is brought to its write mode, and the tri-state gates 150 through 153 are opened.

The address WA1 is still assigned to the memory 132. Therefore, the results of addition latched onto the latch circuits 144 through 147 or $\Sigma Hli+H12$, $\Sigma Vli+V12$, $\Sigma Rli+R12$, and $\Sigma Lli+L12$ are stored in the peripheral length storage areas at WAI to thereby carry out the process of addition for the window W1. The low level state of the timing signal T2 clears the counters 160 through 163, and each falling edge of the write signal WR increments the window counter by one, and sets it ready for the measurement process for the next window.

The peripheral length components data obtained by carrying out such processes until the completion of the measurement period are sequentially read out of the memory 132 by the CPU 110, and the peripheral length data can be obtained carrying out the computation given in equation (27) for each of the windows.

Thus, according to the present embodiment, since a plurality of images can be analyzed at high speed and without requiring a large memory or any other complex structures, a significant improvement in operation efficiency, reducing in manufacturing cost can be achieved.

Figure 34:
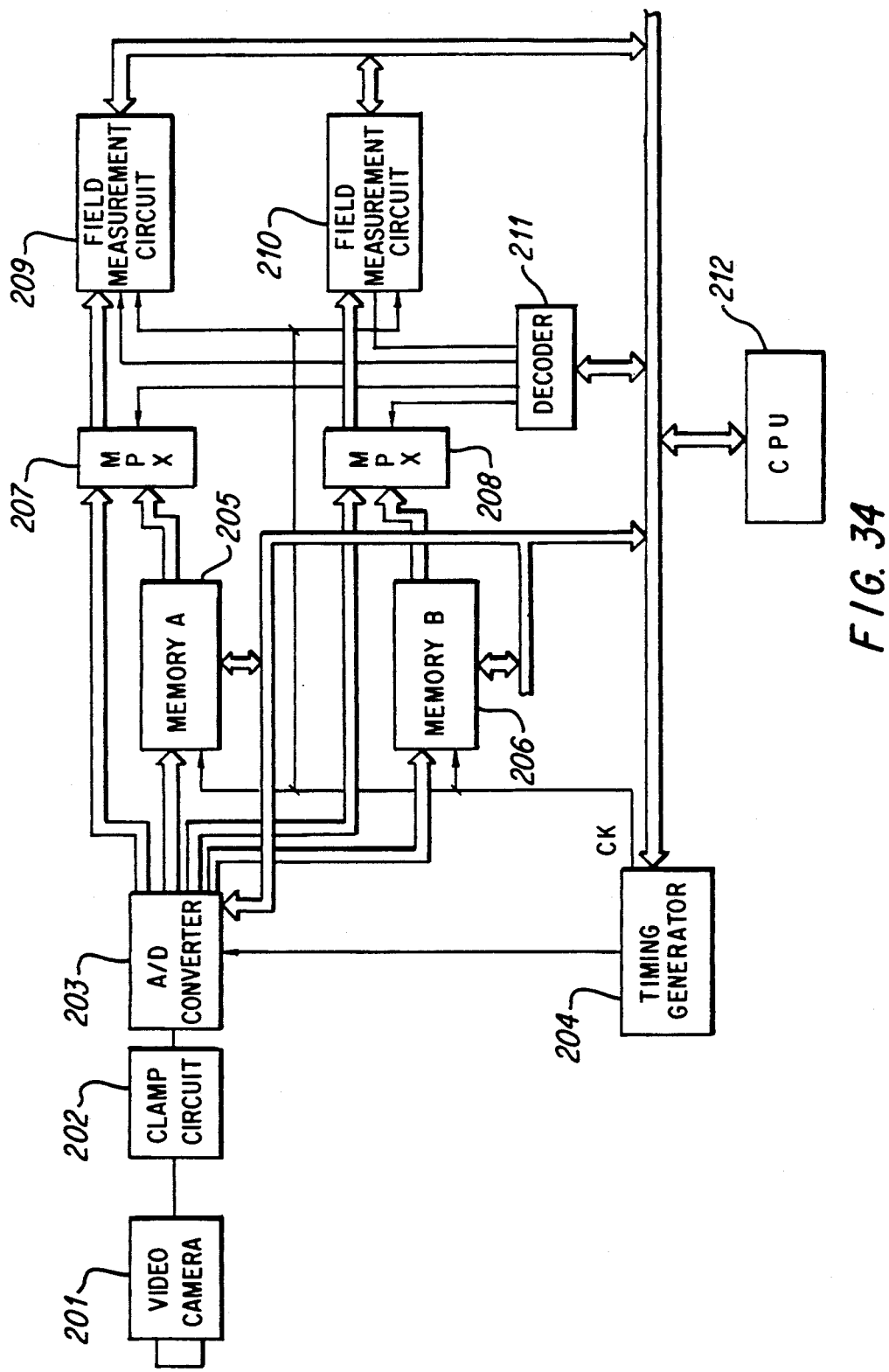
FIG. 34 is a block diagram showing the electric structure of an image processing system constructed as a seventh embodiment of the present invention.
Figure 35:
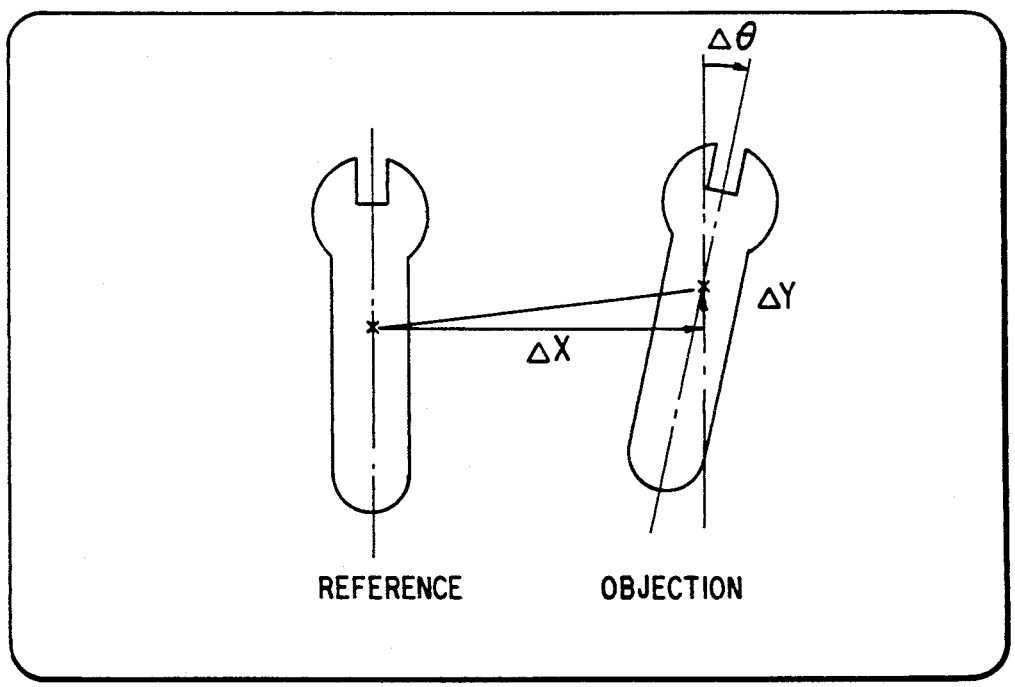
FIG. 35 illustrates an inputted picture image and a reference picture image displayed in a same frame.

FIG. 34 shows an electric structure of a seventh embodiment of the image processing system according to the present invention. According to this embodiment, a video camera 201 takes the picture of an object according to the two to one interlacing system and the obtained video signals are supplied to an A/D converter 203. The A/D converter converts the video signal supplied thereto into a digital signal according to a timing determined by the clock signal supplied from a timing generating circuit 204, and supplies it to a bus 213 which is connected to memories 5 and 6, multiplexers 207 and 208, and a CPU 212.

The memory 205 and 206 are video memories for storing video signals field by field, and supplies image data stored therein to multiplexers 207 and 208 according to the timing determined by the clock signal produced by the timing generating circuit 204. The multiplexers 207 and 208 selectively transmit image data either from the A/D converter 203, the memory 205 or the memory 206 to field measurement circuits 209 and 210 according to the instructions obtained from the CPU 212 via a decoder 211.

The field measurement circuits 209 and 210 measures geometrical features such as areas, gravitational centers, inclinations and so on of picture images given as digital video signals.

According to this image processing system, it is the entire frame which is to processed. In reality, the measurement results obtained by the field measurement circuits 209 and 210 field by field are read by the CPU 212, and the computation for the entire single frame is carried out. Therefore, as opposed to the conventional process of storing image data of an entire frame in memory and carrying out measurements on the contents of the memory, since each frame consists of two fields according to the present embodiment, a significant improvement in processing speed can be achieved.

Now the process of measurement involving correction of positional shifting is described in the following. This correction scheme is an important feature of the present embodiment.

Figure 36:
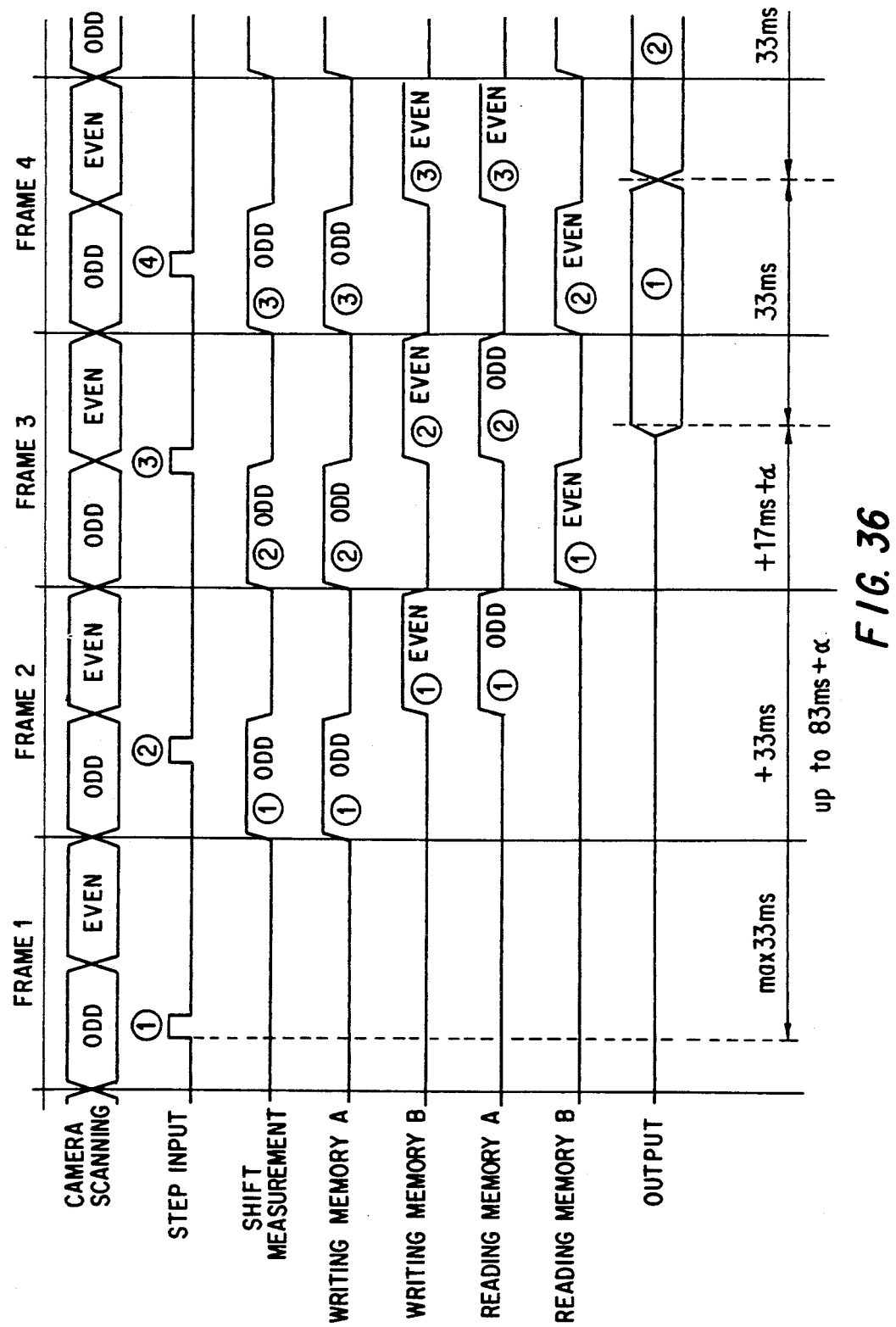
FIG. 36 is a time chart for describing the operation of the seventh embodiment.

Correction of positional shifting is particularly important when an objecting is moving at high speed. For instance, when an object located in the field of vision of the camera 201 has shifted from a reference position by x due to inaccuracy in the timing of picture taking, geometric features of the object can be accurately extracted if such shifting is corrected. Positional shifting may occur horizontal, vertically or angularly. To simply the description, consider an angular positional shifting. Even when the shifting is large in value, a satisfactory compensation possible. The actual process of correcting positional shifting is carried out as shown by the timing chart of FIG. 36.

An STEP signal which is not synchronized with the image signal from the camera 201 is supplied to the image processing system to indicate the start of the process of measurement. In the scanning pattern of the camera 201 illustrated in FIG. 36, ODD denotes an odd field, and EVEN denotes even fields. When the start of measurement is instructed in step 1 for frame 1, a video signal is produced from the camera according to the timing of the frame (2).

The odd field 202 preceding the even field is converted into a digital signal by the A/D converter 203, and supplied to one of the field measurement circuit 209 so that extraction of geometrical features from the picture image may be carried out by the CPU 212. Typically, each measurement frame consists of 512 (H) by 480 pixels (V), but the extraction of geometrical features is carried out on each field which consists of 512 (H) by 240 pixels (V). Therefore, there are only half as many pixels along the vertical direction as compared with a single frame, the centers of gravity can be obtained with a high resolution and a sufficient accuracy can be obtained for most purposes.

Meanwhile, the data in the odd field is stored in the memory A at the same time. Thereafter, data from the even field is converted into a digital signal by the A/D converter 203, and, after a selection is made by the multiplexer 208, a desired measurement is carried out by the field measurement circuit 210 with its positional shifting corrected according to positional information obtained from the odd field.

The data in the even field is stored in the memory B at the same time. A desired measurement is carried out by the field measurement circuit 209 with respect to the data of the odd field which was stored in the memory A, with its positional shifting corrected again according to positional information obtained from the odd field.

In this way, image data for one frame obtained from a camera can be measured with its positional shifting corrected and may be outputted after applying a desired software processing thereon (processing time $a$). The time T required from the occurrence of the STEP signal to the time of output is given by 50 ms $+a<$ T$<$83 ms$+a$ considering the randomness of the STEP signal.

The above described example was a case of carrying out a measurement process only once. However, when the STEP signal is supplied repeatedly, the output may be produced at the interval of 33.3 ms. In other words, a measurement process can be carried out every 33.3 ms, and it amounts to the execution of 1,800 measurement process in a minute. Thus, the present embodiment offers a continual and extremely high speed measuring processes which have been impossible with equivalent conventional systems.

The present embodiment was applied to a camera whose output image signal was converted into multi-bit signal by an A/D converter 203. However, the present embodiment can also be applied to a simplified version of the image processing system in which a binary discrimination circuit is used instead of an A/D converter 203, and in this case a significant reduction in the necessary capacity of the memory can be achieved.

Thus, according to the present embodiment, the video memory and the measurement circuits are divided to act on each field, thereby providing the possibility of carrying out parallel processing and pipeline processing as well as an efficient correction of positional shifting.

What We claim is:

1. An image processing system, comprising:
    camera means for taking a picture image of an object and producing a corresponding picture image signal;
    a binary discrimination means for converting said picture image signal into a binary signal;
    storage means for storing said binary signal; and
    feature extracting means for extracting a geometric feature of said picture image by first processing said binary signal to produce edge information of said picture image and then processing said edge information to extract said geometric feature of said picture image.

2. An image processing system according to claim 1, wherein said feature extracting means comprises:
    an edge detection circuit having a hardware structure for detecting an edge defining a picture image as given by reversion of said binary signal stored in said storage means, and writing addresses of said detected edge into an edge information memory; and
    an arithmetic processing unit for computing, through a software process, geometric features from a graphic image included in said picture image of said object according to data on edge addresses stored in said edge information memory.

3. An image processing system according to claim 1, wherein:

said storage means comprises first storage means for storing a plurality of windows defined in a frame of said picture image, window signal generating means for reading data from each of said windows in synchronism with each horizontal scanning process and producing a window signal to identify locations of said windows, second storage means for storing the sequence of encounters of said windows during said horizontal scanning process; and said feature extracting means comprises arithmetic operation means for computing a number of pixels occupied by a graphic image included in each of said windows, a horizontal first moment of said graphic image with respect to its horizontal coordinate for each pixel in said graphic image, and a vertical first moment of said graphic image with respect to its vertical coordinate for each pixel in said graphic image, cumulative arithmetic operation means for summing up said horizontal first moments and said vertical first moments for a graphic image included in each of said windows, and gravitational center computing means for computing a gravitational center of the graphic image in each of said windows according to the number of pixels occupied by the graphic image, a cumulative sum of said horizontal first moments and a cumulative sum of said vertical first moments for a graphic image included in each of said windows.

4. An image processing system according to claim 1, wherein:

said storage means comprises a window memory which is partitioned into a plurality of sections corresponding to a plurality of windows fixedly defined in a single display frame; and said feature extracting means comprises a measurement processing unit for allocating each of a plurality of objects included in a single frame to one or more of said windows without regards to its physical location of said object in said frame.

5. An image processing system according to claim 1, further comprising:

gradation input means for obtaining a gradation signal representing a distribution of gradation in a picture image to be processed;

said storage means comprising an image memory unit which may be partitioned into a plurality of sections corresponding to a plurality of windows defined in a single frame and which is adapted to store data on said gradation signal supplied from said gradation input means, and a table memory unit storing a plurality of tables each for an associated one of said windows so as to permit individual extraction of an arbitrary gradation level for each of said windows.

6. An image processing system according to claim 1, wherein said feature extracting means comprises means for detecting an edge of a picture image, means for detecting a vertical component, a horizontal component or an oblique component from each detected edge, and means for adding up said components over an entire length of the periphery of said picture image to obtain a peripheral length thereof.

7. An image processing system according to claim 1, wherein said storage means comprises first storage means for defining a plurality of windows in a single frame, window generating means for reading out the windows in synchronism with a scanning operation of picture taking means and generates a window signal indicating the location and the size of each of said windows, second storage means for storing a sequential pattern of appearance of said windows on each of horizontal scanning lines, and third storage means for storing data for designating the sequential pattern of appearance of said windows for each horizontal scanning of said picture taking means on each of horizontal scanning lines, and a fourth storage means for storing data for obtaining a geometric feature of said picture image for each of said windows; and said feature extracting means comprises means for extracting representative pixels which are required for determination of a geometric feature of a picture image included in each of said windows along each horizontal scanning line, and means for allocating pixels detected on each horizontal scanning line to memory areas designated for different one of said windows to allow extraction of a geometric feature of image signals for each of said windows.

8. An image processing system according to claim 1, further comprising means for scanning an object by a 2 to 1 interlacing, means for detecting positional shifting between two of said fields defining a single frame, and means for correcting positional shifting for each field according to the detected amount of positional shifting.

9. An image processing system, comprising:

camera means for taking a picture image of an object and producing a corresponding picture image signal;

a binary discrimination means for converting said picture image signal into a binary signal;

storage means for storing said binary signal; and feature extracting means for extracting a geometric feature of said picture image by processing said binary signals, wherein said feature extracting means comprises:

an edge detection circuit having a hardware structure for detecting an edge defining a picture image as given by reversion of said binary signal stored in said storage means, and writing addresses of said detected edge into an edge information memory; and an arithmetic processing unit for computing, through a software process, geometric features from a graphic image included in said picture image of said object according to data on edge addresses stored in said edge information memory.

10. An image processing system, comprising:

camera means for taking a picture image of an object and producing a corresponding picture image signal;

a binary discrimination means for converting said picture image signal into a binary signal;

storage means for storing said binary signal; and feature extracting means for extracting a geometric feature of said picture image by processing said binary signals, and wherein said storage means comprises first storage means for storing a plurality of windows defined in a frame of said picture image, window signal generating means for reading data from each of said windows in synchronism with each horizontal scanning process and producing a window signal to identify locations of said windows, second storage means for storing the sequence of encounters of said windows during said horizontal scanning process; and said feature extracting means comprises arithmetic operation means for computing a number of pixels occupied by a graphic image included in each of said windows, a horizontal first moment of said graphic image with respect to its horizontal coordinate for each pixel in said graphic image, and a vertical first moment of said graphic image with respect to its vertical coordinate for each pixel inn said graphic image, cumulative arithmetic operation means for summing up said horizontal first moments and said vertical first moments for a graphic image included in each of said windows, and gravitational center computing means for computing a gravitational center of the graphic image in each of said windows according to the number of pixels occupied by the graphic image, a cumulative sum of said horizontal first moments and a cumulative sum of said vertical first moments for a graphic image included in each of said windows.

11. An image processing system, comprising:

camera means for taking a picture image of an object and producing a corresponding picture image signal;

a binary discrimination means for converting said picture image signal into a binary signal;

storage means for storing said binary signal; and feature extracting means for extracting a geometric feature of said picture image by processing said binary signals, and wherein said storage means comprises a window memory which is partitioned into a plurality of sections corresponding to a plurality of windows fixedly defined in a single display frame; and said feature extracting means comprises a measurement processing unit for allocating each of a plurality of objects included in a single frame to one or more of said windows without regards to its physical location of said object in said frame.

12. An image processing system, comprising:

camera means for taking a picture image of an object and producing a corresponding picture image signal;

a binary discrimination means for converting said picture image signal into a binary signal;

storage means for storing said binary signal;

feature extracting means for extracting a geometric feature of said picture image by processing said binary signals; and gradation input means for obtaining a gradation signal representing a distribution of gradation in a picture image to be processed;

said storage means comprising an image memory unit which may be partitioned into a plurality of sections corresponding to a plurality of windows defined in a single frame and which is adapted to store data on said gradation signal supplied from said gradation input means, and a table memory unit storing a plurality of tables each for ann associated one of said windows so as to permit individual extraction of an arbitrary gradation level for each of said windows.

13. An image processing system, comprising:

camera means for taking a picture image of an object and producing a corresponding picture image signal;

a binary discrimination means for converting said picture image signal into a binary signal;

storage means for storing said binary signal; and feature extracting means for extracting a geometric feature of said picture image by processing said binary signals, and wherein said storage means comprises first storage means for defining a plurality of windows in a single frame, windows generating means for reading out the windows in synchronism with a scanning operation of picture taking means and generates a window signal indicating the location and the size of each of said windows, second storage means for storing a sequential pattern of appearance of said windows on each of horizontal scanning lines, and third storage means for storing data for designating the sequential pattern of appearance of said windows for each horizontal scanning of said picture taking means on each of horizontal scanning lines, and a fourth storage means for storing data for obtaining a geometric feature of said picture image for each of said windows; and said feature extracting means comprises means for extracting representative pixels which are required for determination of a geometric feature of a picture image included in each of said windows along each horizontal scanning line, and means for allocating pixels detected on each horizontal scanning line to memory area designated for different one of said windows to allow extraction of a geometric feature of image signals for each of said windows.

14. An image processing system, comprising:

camera means for taking a picture image of an object and producing a corresponding picture image signal;

a binary discrimination means for converting said picture image signal into a binary signal;

storage means for storing said binary signal;

feature extracting means for extracting a geometric feature of said picture image by processing said binary signals; and means for scanning an object by a 2 to 1 interlacing, means for detecting positional shifting between two fields defining a single frame, and means for correcting positional shifting for each field according to the detected amount of positional shifting.

* * * * *